(12) United States Patent
Katou et al.

(10) Patent No.: US 6,371,262 B1
(45) Date of Patent: Apr. 16, 2002

(54) DAMPING FORCE CONTROL TYPE HYDRAULIC SHOCK ABSORBER

(75) Inventors: Tetsuo Katou, Kanagawa-ken; Takashi Nezu, Tokyo; Takao Nakadate, Kanagawa-ken, all of (JP)

(73) Assignee: Tokico Ltd., Kanagawa-ken (JP)

( * ) Notice: Subject to any disclaimer, the term of this patent is extended or adjusted under 35 U.S.C. 154(b) by 0 days.

(21) Appl. No.: 09/560,561

(22) Filed: Apr. 28, 2000

(30) Foreign Application Priority Data

Apr. 28, 1999 (JP) .......................................... 11-121787
Sep. 21, 1999 (JP) .......................................... 11-267536
Sep. 30, 1999 (JP) .......................................... 11-279612
Mar. 24, 2000 (JP) ........................................ 2000-084146

(51) Int. Cl.⁷ ................................................. F16F 9/34
(52) U.S. Cl. .................................. 188/266.5; 188/282.6
(58) Field of Search .......................... 188/266.2, 266.6, 188/266.5, 282.4, 282.6, 283, 283.1, 322.15

(56) References Cited

U.S. PATENT DOCUMENTS

| | | | | |
|---|---|---|---|---|
| 4,953,671 A | * | 9/1990 | Imaizumi ..................... | 188/299 |
| 5,016,907 A | * | 5/1991 | Atatsu et al. ................ | 280/707 |
| 5,048,861 A | * | 9/1991 | Takahashi .................... | 280/707 |
| 5,129,489 A | * | 7/1992 | Majima et al. ............... | 188/299 |
| 5,655,633 A | * | 8/1997 | Nakadate et al. ............ | 188/299 |
| 5,690,195 A | * | 11/1997 | Kruckemeyer et al. ..... | 188/299 |
| 5,833,037 A | * | 11/1998 | Preukschat ................ | 188/299.1 |
| 5,901,820 A | * | 5/1999 | Kashiwagi et al. ........ | 188/266.6 |
| 5,934,421 A | * | 8/1999 | Nakadate et al. ........ | 188/299.1 |
| 5,950,775 A | * | 9/1999 | Achmad ................... | 188/282.2 |
| 5,975,258 A | * | 11/1999 | Nezu et al. ............. | 188/322.15 |
| 6,119,829 A | * | 9/2000 | Nakadate .................. | 188/266.6 |

FOREIGN PATENT DOCUMENTS

| | | | |
|---|---|---|---|
| JP | 406042572 A | * | 2/1994 |
| JP | 10-61710 | | 3/1998 |
| JP | 411082602 A | * | 3/1999 |

* cited by examiner

*Primary Examiner*—Christopher P. Schwartz
*Assistant Examiner*—Xuan Lan Nguyen
(74) *Attorney, Agent, or Firm*—Wenderoth, Lind & Ponack, L.L.P.

(57) ABSTRACT

The flow of a hydraulic fluid, which occurs under a sliding movement of a piston in a cylinder, is directly controlled by virtue of an extension-stroke pressure control valve and a compression-stroke pressure control valve. At the same time, the pressure in a back pressure chamber is varied, to thereby adjust the valve opening pressure for a main disk valve. This enables control of a damping force over a wide range. In each of the extension-stroke and compression-stroke pressure control valves, a thrust is generated in a slider due to a difference in pressure-receiving areas between a stepped portion of the slider and a sub disk valve in a valve chamber. The valve opening pressure is controlled, according to the balance between the thrust of the slider and a thrust of a proportional solenoid. By reducing the difference in the pressure-receiving areas in the valve chamber, the load applied to the proportional solenoid can be reduced.

18 Claims, 16 Drawing Sheets

DAMPING FORCE CONTROL TYPE HYDRAULIC SHOCK ABSORBER

BACKGROUND OF THE INVENTION

The present invention relates to a damping force control type hydraulic shock absorber which is mounted on a suspension apparatus of a vehicle, such as an automobile.

As an example of a hydraulic shock absorber which is mounted on a suspension apparatus of a vehicle, such as an automobile, there can be mentioned a damping force control type hydraulic shock absorber which is capable of controlling a damping force in response to variations in road conditions, vehicle running conditions, etc., with the aim of improving ride quality or steering stability of a vehicle.

Such a damping force control type hydraulic shock absorber generally comprises: a cylinder in which a hydraulic fluid is sealably contained; a piston silidably provided in the cylinder so as to divide the interior of the cylinder into two chambers; and a piston rod connected to the piston. The piston includes a main fluid passage and a bypass passage for enabling communication between the two chambers in the cylinder. A damping force generating mechanism including an orifice and a disk valve is provided in the main fluid passage. A damping force control valve is provided in the bypass passage so as to adjust a flow path area of the bypass passage.

When the bypass passage is opened by virtue of the damping force control valve, the flow resistance of the hydraulic fluid between the two chambers in the cylinder is reduced, thereby generating a small damping force. On the other hand, when the bypass passage is closed, the flow resistance of the hydraulic fluid between the two chambers in the cylinder is increased, thereby generating a large damping force. Thus, damping force characteristics can be appropriately controlled by opening and closing the damping force control valve.

In this hydraulic shock absorber in which the damping force is controlled by adjusting the flow path area of the bypass passage, when the piston is operating at low speed, a damping force is generated depending on the restriction of an orifice in the fluid passage, so as to enable damping force characteristics to be widely varied. However, when the piston is operating at a medium or high speed, a damping force is dependent on the degree of opening of the damping force generating mechanism (such as the disk valve) in the main fluid passage, with the result that it is difficult to widely vary damping force characteristics.

As a countermeasure, in the damping force control type hydraulic shock absorber of Unexamined Japanese Patent Application Public Disclosure (Kokai) No. 7-332425, a pressure chamber (a pilot chamber) is formed on a back side of a disk valve which provides a damping force generating mechanism in a main fluid passage commonly used for an extension stroke and a compression stroke of the piston rod. This pressure chamber is communicated through a fixed orifice with a cylinder chamber disposed upstream of the disk valve, and communicated through a variable orifice (a flow rate control valve) with a cylinder chamber disposed downstream of the disk valve.

In this damping force control type hydraulic shock absorber, while the flow path area of the communication passage between the two cylinder chambers is adjusted by opening and closing the variable orifice, the initial pressure for opening the disk valve is varied in response to a change in pressure in the pressure chamber, which change occurs as a result of a pressure loss generated in the variable orifice. Thus, orifice characteristics (of a damping force varying substantially in proportion to the square of the piston speed) and valve characteristics (of a damping force varying substantially in proportion to the piston speed) can be controlled, thus enabling control of damping force characteristics over a wide range.

However, the damping force control type hydraulic shock absorber in Kokai No. 7-332425 involves the following problems. Namely, because the damping force is controlled by virtue of flow control using a variable orifice, the damping force which is actually generated varies, depending on a piston speed. Therefore, when a large vibration is transmitted suddenly when the vehicle encounters a bump on a road surface, the damping force sharply increases in accordance with an increase in piston speed, thus transmitting shock to the vehicle body and causing a deterioration in ride quality. Further, because the variable orifice has a small flow path area (generally only several mm$^2$), the flow resistance of the hydraulic fluid is likely to vary due to dimensional tolerances of valve members such as a sleeve and spool, thus making it difficult to obtain stable damping force characteristics. Further, the flow resistance generated by the variable orifice largely varies depending on the viscosity of the hydraulic fluid. Therefore, damping force characteristics are greatly influenced by temperature changes, thus making it difficult to obtain stable damping force characteristics. the variable orifice has a small flow path area (generally only several mm$^2$), the flow resistance of the hydraulic fluid is likely to vary due to dimensional tolerances of valve members such as a sleeve and spool, thus making it difficult to obtain stable damping force characteristics. Further, the flow resistance generated by the variable orifice largely varies depending on the viscosity of the hydraulic fluid. Therefore, damping force characteristics are greatly influenced by temperature changes, thus making it difficult to obtain stable damping force characteristics.

SUMMARY OF THE INVENTION

In view of the above, the present invention has been made. It is an object of the present invention to provide a damping force control type hydraulic shock absorber which is capable of controlling damping force characteristics over a wide range, directly controlling a damping force regardless of a piston speed, and suppressing an effect of dimensional tolerances of valve members and temperature changes with respect to damping force characteristics, and which is also capable of readily absorbing the sudden transmission of pronounced vibrations.

According to the present invention, there is provided a damping force control type hydraulic shock absorber comprising: a cylinder in which a hydraulic fluid is sealably contained; a piston slidably provided in the cylinder; and a piston rod having one end connected to the piston and the other end extending to an outside of the cylinder. A main fluid passage and a sub fluid passage are connected to the cylinder so as to permit flow of the hydraulic fluid therethrough in accordance with a sliding movement of the piston. The damping force control type hydraulic shock absorber further comprises: a pilot type damping valve provided in the main fluid passage; and a fixed orifice and a pressure control valve provided in the sub fluid passage so that a pressure of the hydraulic fluid between the fixed orifice and the pressure control valve in the sub fluid passage is applied to the pilot type damping valve as a pilot pressure. The pressure control valve includes a valve chamber formed between a cylindrical sleeve and a slider slidably provided in the sleeve. An axial thrust is generated in the slider due to a difference between pressure-receiving areas in the valve chamber for receiving a pressure acting in a direction of the axis of the slider. A valve opening pressure is controlled in accordance with a balance between the thrust of the slider and a thrust of a solenoid.

By this arrangement, the valve opening pressure for the pilot type damping valve is directly adjusted by adjusting the valve opening pressure for the pressure control valve, by utilizing the thrust of the slider. At the same time, the pilot pressure is varied in accordance with controlled pressure of the pressure control valve, to thereby adjust the valve opening pressure for the pilot type damping valve. In this instance, the pressure control valve generates an axial thrust of the slider due to a difference between pressure-receiving areas in the valve chamber for receiving a pressure acting in a direction of the axis of the slider. The valve opening pressure is controlled in accordance with the balance between the thrust of the slider and a thrust of a solenoid, to thereby control the damping force.

According to an embodiment of the present invention, a disk valve is connected to the sleeve or the slider and the thrust is generated in the slider due to the difference between the pressure-receiving area of the disk valve and the pressure-receiving area of the slider in the valve chamber.

By this arrangement, a sharp rise in hydraulic pressure can be relieved by deflecting the disk valve.

According to another embodiment of the present invention, an extension-stroke valve chamber and a compression-stroke valve chamber are formed at opposite end portions of the slider and damping force characteristics are varied in opposite directions between an extension stroke and a compression stroke of the piston rod.

The foregoing and other objects, features and advantages of the present invention will be apparent from the following detailed description and appended claims taken in connection with the accompanying drawings.

DETAILED DESCRIPTION OF THE INVENTION

Hereinbelow, embodiments of the present invention are described in detail, referring to the accompanying drawings.

Figure 1:
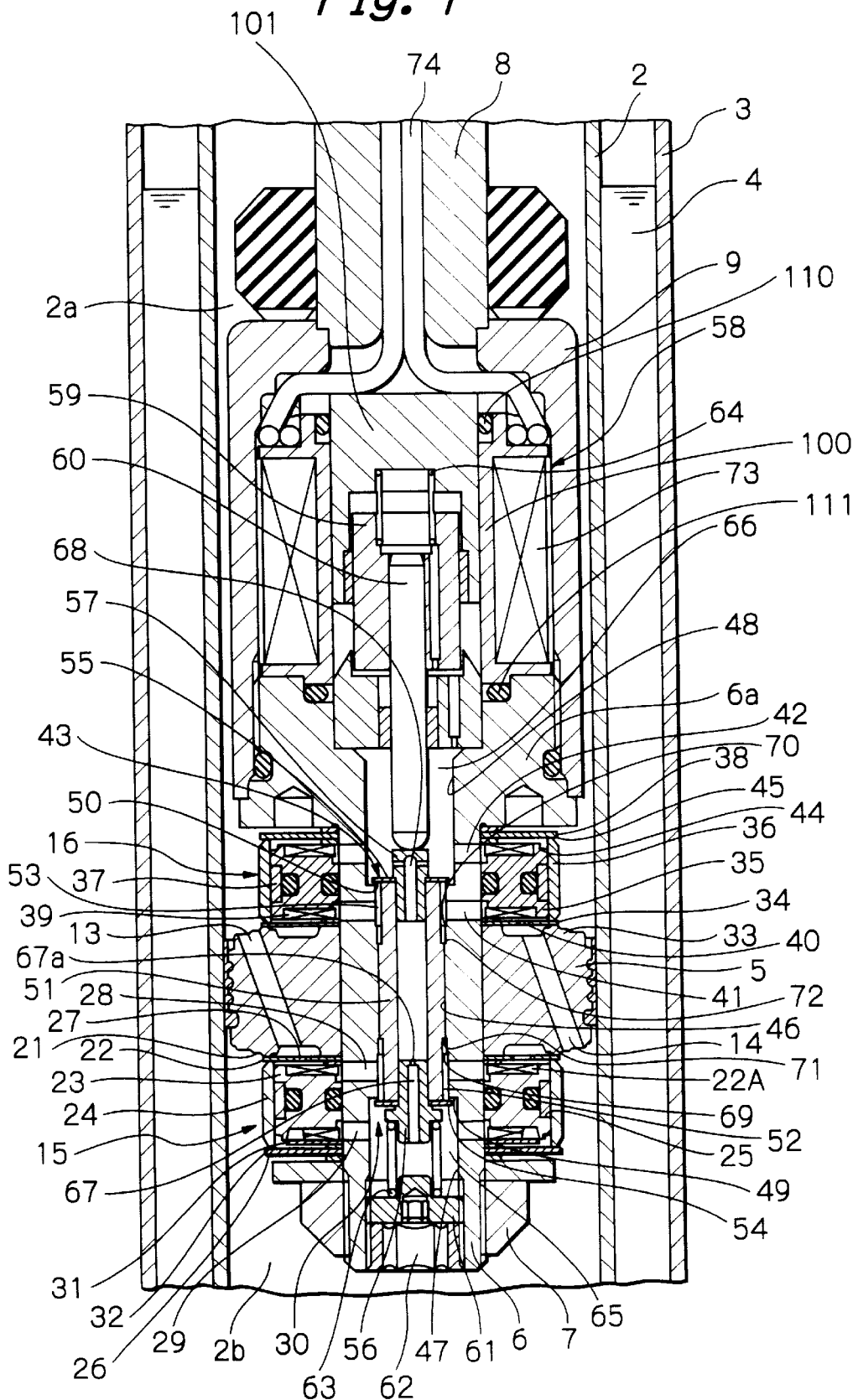
FIG. 1 is an enlarged vertical cross-sectional view showing an essential part of a damping force control type hydraulic shock absorber in a first embodiment of the present invention.
Figure 2:
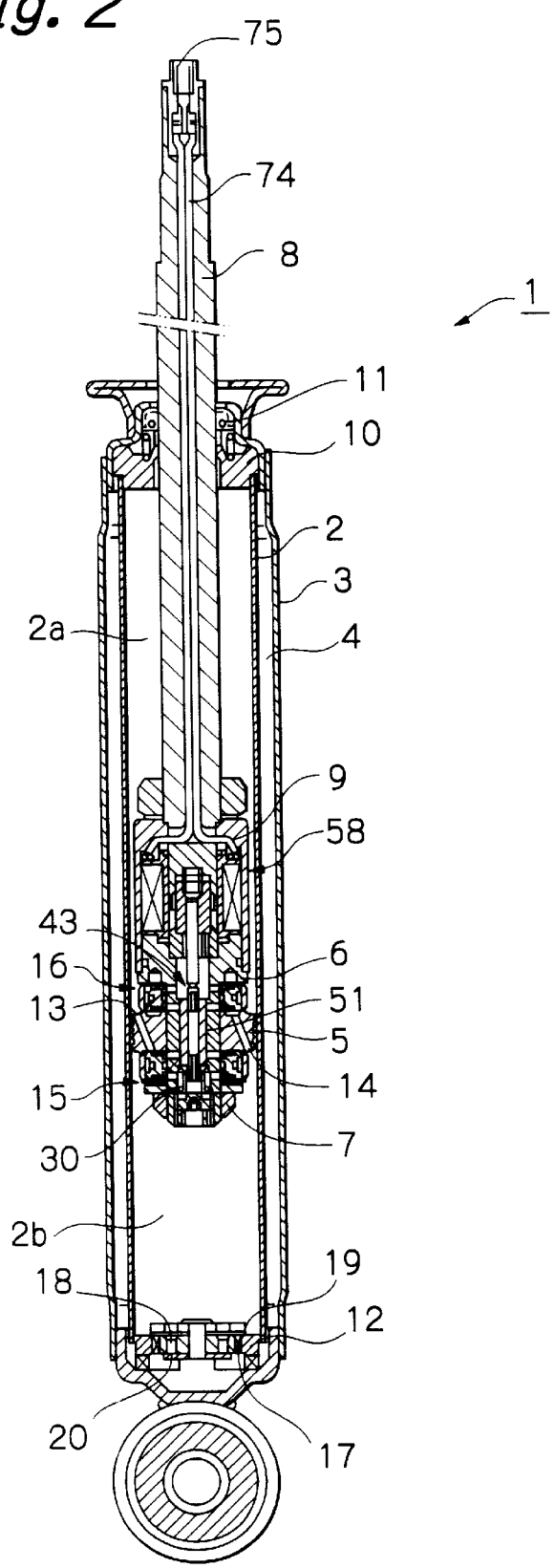
FIG. 2 is a vertical cross-sectional view of the hydraulic shock absorber of FIG. 1 as a whole.

A first embodiment of the present invention is described, with reference to FIGS. 1 and 2.

As shown in FIGS. 1 and 2, a damping force control type hydraulic shock absorber 1 in the first embodiment of the present invention comprises a dual cylinder including an inner cylinder 2 and an outer cylinder 3 provided outside the cylinder 2. A reservoir 4 is formed between the cylinders 2 and 3. A piston 5 is slidably provided in the cylinder 2 so as to divide the interior of the cylinder 2 into an upper cylinder chamber 2a and a lower cylinder chamber 2b. A generally cylindrical piston bolt (or a sleeve) 6 extending through the piston 5 is fixed by a nut 7. A large-diameter portion 6a formed at a proximal end portion of the piston bolt 6 is threadably engaged with a solenoid case 9 fixed by being welded to one end portion of a piston rod 8. The piston rod 8 on a side opposite the solenoid case 9 extends to the outside of the cylinder 2 through the upper cylinder chamber 2a and a rod guide 10 and an oil seal 11 provided at an upper end portion of the cylinder 2 and outer cylinder 3. A base valve 12 for separating the lower cylinder chamber 2b and the reservoir 4 is provided at a lower end portion of the cylinder 2.

An extension-stroke fluid passage 13 and a compression-stroke fluid passage 14 are formed in the piston 5, so as to enable communication between the upper cylinder chamber 2a and the lower cylinder chamber 2b. An extension-stroke damping force generating mechanism 15 is provided between the piston 5 and the nut 7, so as to control a flow of a hydraulic fluid in the extension-stroke fluid passage 13. A compression-stroke damping force generating mechanism 16 is provided between the piston 5 and the large-diameter portion 6a of the piston bolt 6, so as to control a flow of the hydraulic fluid in the compression-stroke fluid passage 14. Fluid passages 17 and 18 are provided in the base valve 12, so as to enable communication between the lower cylinder chamber 2b and the reservoir 4. A check valve 19 is provided on the base valve 12 so as to permit a flow of the hydraulic fluid only from the reservoir 4 to the lower cylinder chamber 2b. Further, a disk valve 20 is provided on the base valve 12. When a pressure of the hydraulic fluid in the lower cylinder chamber 2b reaches a predetermined level, the disk valve 20 opens, to thereby permit a flow of the hydraulic fluid from the lower cylinder chamber 2b through the fluid passage 18 to the reservoir 4. The hydraulic fluid is sealably contained in the cylinder 2. The hydraulic fluid and a gas having a predetermined pressure are sealably contained in the reservoir 4.

Next, the extension-stroke damping force generating mechanism 15 will be described in detail. A protruding annular valve seat 21 is formed on an end surface of the piston 5 on a side of the lower cylinder chamber 2b, and a main disk valve (or a pilot type damping valve) 22 is seated over the valve seat 21. An annular fixing member 23 is attached to the piston bolt 6 between the piston 5 and the nut 7. A movable ring 24 is slidably fitted onto an outer circumferential surface of the fixing member 23. A slide ring 25 made of fluororesin is provided between the fixing member 23 and the movable ring 24. The slide ring 25 seals a space between the fixing member 23 and the movable ring 24 and enables a smooth sliding movement of the movable ring 24. The movable ring 24 abuts against the main disk valve 22 under a force generated by a disk-like leaf spring 26 clamped between the fixing member 23 and the nut 7, thus forming a back pressure chamber 22A between the main disk valve 22 and the fixing member 23. An internal pressure of the back pressure chamber 22A is applied in a direction for closing the main disk valve 22. The back pressure chamber 22A is communicated with the extension-stroke fluid passage 13 through a fixed orifice 27 provided in the main disk valve 22. Further, the back pressure chamber 22A is communicated through fluid passages 28 and 29 provided in a side wall of the piston bolt 6 with the side of the fixing member 23 remote from the back pressure chamber 22A through an extension-stroke pressure control valve 30, which is provided in the piston bolt 6. The back pressure chamber 22A is also communicated with the lower cylinder chamber 2b through a check valve (or a disk valve) 31 on the fixing member 23 and a fluid passage (a cut portion) 32 in the leaf spring 26.

Next, the compression-stroke damping force generating mechanism 16 will be described in detail. A protruding annular valve seat 33 is formed on an end surface of the piston 5 on a side of the upper cylinder chamber 2a, and a main disk valve (or a pilot type damping valve) 34 is seated over the valve seat 33. An annular fixing member 35 is attached to the piston bolt 6 between the large-diameter portion 6a thereof and the piston 5. A movable ring 36 is slidably fitted onto an outer circumferential surface of the fixing member 35. A slide ring 37 made of fluororesin is provided between the fixing member 35 and the movable ring 36. The slide ring 37 seals a space between the fixing member 35 and the movable ring 36 and enables a smooth sliding movement of the movable ring 36. The movable ring 36 abuts against the main disk valve 34 under a force generated by a disk-like leaf spring 38 clamped between the fixing member 35 and the large-diameter portion 6a, thus forming a back pressure chamber 39 between the main disk valve 34 and the fixing member 35. An internal pressure of the back pressure chamber 39 is applied in a direction for closing the main disk valve 34. The back pressure chamber 39 is communicated with the compression-stroke fluid passage 14 through a fixed orifice 40 provided in the main disk valve 34. Further, the back pressure chamber 39 is communicated through fluid passages 41 and 42 provided in the side wall of the piston bolt 6 with the side of the fixing member 35 remote from the back pressure chamber 39 through a compression-stroke pressure control valve 43, which is provided in the piston bolt 6. The back pressure chamber 39 is also communicated with the upper cylinder chamber 2a through a check valve (or a disk valve) 44 on the fixing member 35 and a fluid passage (a cut portion) 45 in the leaf spring 38.

Next, the extension-stroke and compression-stroke pressure control valves 30 and 43 will be described in detail. A small-diameter bore 46 to which the fluid passages 28 and 41 are open is formed at a central portion of the piston bolt 6. Large-diameter bores 47 and 48 to which the fluid passages 29 and 42 are open are formed on opposite sides of the small diameter bore 46. Stepped portions between the small-diameter bore 46 and the large-diameter bores 47 and 48 form annular valve seats 49 and 50. A cylindrical slider 51 is slidably provided in the small-diameter bore 46 of the piston bolt 6. Annular valve chambers 52 and 53 communicated with the fluid passages 28 and 41 are formed between small-diameter portions formed at opposite end portions of the slider 51 and the small-diameter bore 46. Sub disk valves 54 and 55 which are separably seated over the valve seats 49 and 50 are attached to the opposite end portions of the slider 51 by retainers 56 and 57. The retainers 56 and 57 are press-fitted into the slider 51.

A proportional solenoid 58 is provided in the solenoid case 9. A plunger 59 of the proportional solenoid 58 is connected to an operating rod 60 and a distal end portion of the operating rod 60 abuts against the retainer 57 attached to one end portion of the slider 51. An adjusting plug 61 and a lock nut 62 are threadably engaged with the large-diameter bore 47 of the piston bolt 6 so as to close a distal end portion thereof. A compression spring 63 is provided between the retainer 56 attached to the other end portion of the slider 51 and the adjusting plug 61. A compression spring 64 is provided so as to press a rear end portion of the plunger 59 of the proportional solenoid 58. The slider 51 is resiliently held under a force generated by these compression springs. Fluid passages 67 and 68 are formed in the retainers 56 and 57 so as to enable communication between fluid chambers 65 and 66 formed on opposite sides of the slider 51 so that the pressures acting on the opposite end portions of the slider 51 are balanced. An orifice 67a is provided in the fluid passage 67 so as to apply an appropriate damping force to movement of the slider 51.

Figure 3:
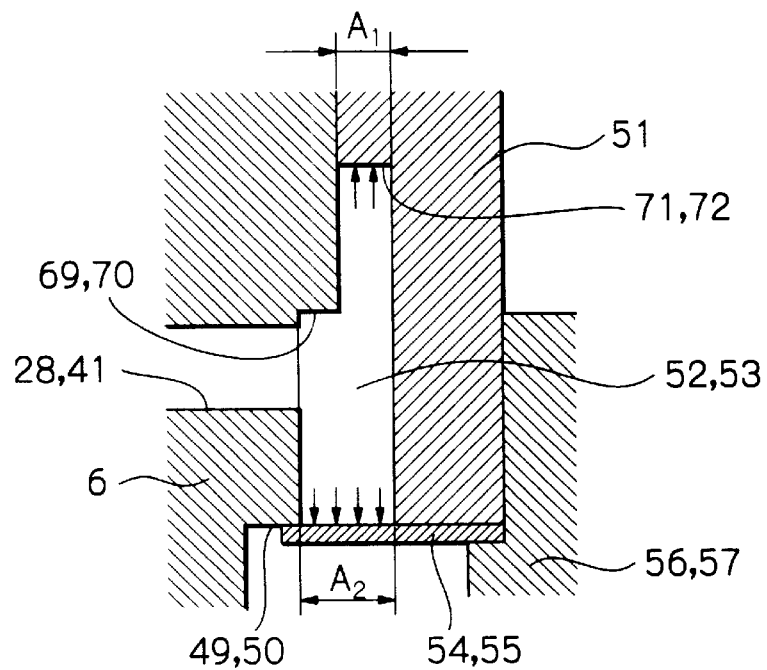
FIG. 3 is an enlarged vertical cross-sectional view showing a general construction of an essential part of a pressure control valve of the hydraulic shock absorber of FIG. 1.

The small-diameter bore 46 of the piston bolt 6 includes stepped portions 69 and 70 formed at positions within the fluid chambers 52 and 53. In the fluid chambers 52 and 53, pressure-receiving areas $A_2$ of the sub disk valves 54 and 55 (pressure-receiving areas for generating thrust for the slider 51 in a valve opening direction) are greater than pressure-receiving areas $A_1$ of stepped portions 71 and 72 of the slider 51 (pressure-receiving areas for generating thrust for the slider 51 in a valve closing direction) (see FIG. 3). It should be noted that the shape of the bore of the piston bolt 6 and the shape of an outer circumferential surface of the slider 51 are not limited to those in this embodiment. The bore of the piston bolt 6 and the outer circumferential surface of the slider 51 need not necessarily include stepped portions and may be tapered or be shaped in various other forms, as long as the pressure-receiving area $A_2$ for generating thrust for the slider 51 in the valve opening direction is substantially greater than the pressure-receiving area $A_1$ for generating thrust for the slider 51 in the valve closing direction.

A lead wire 74 from a coil 73 of the proportional solenoid 58 extends to the outside through the piston rod 8 having a hollow structure. The coil 73 is energized by terminals connected to a distal end of the lead wire 74. Normally, the slider 51 is held at a position such that the sub disk valves 54 and 55 are separated from the valve seats 49 and 50, by virtue of the spring 63 and 64. When the coil 73 is energized, the proportional solenoid 58 selectively biases the sub disk valves 54 and 55, by a thrust having a magnitude and a direction corresponding to the current applied to the solenoid, so that one of the sub disk valves 54 and 55 moves in the valve closing direction and the other moves in the valve opening direction. It should be noted that an initial position of the slider 51 can be adjusted by the adjusting plug 61 and the lock nut 62.

Hereinbelow, description is made with regard to an operation of the damping force control type hydraulic shock absorber in the first embodiment.

During an extension stroke of the piston rod 8, the hydraulic fluid in the upper cylinder chamber 2a is pressurized under movement of the piston 5. In this instance, before the main disk valve 22 of the extension-stroke damping force generating mechanism 15 opens (when the piston operates at low speed, in the low speed range of the piston speed), the hydraulic fluid flows from the upper cylinder chamber 2a to the lower cylinder chamber 2b through the extension-stroke fluid passage 13, the fixed orifice 27 of the main disk valve 22, the back pressure chamber 22A, the fluid passage 28, the extension-stroke pressure control valve 30, the fluid passage 29, the check valve 31 and the fluid passage 32. When the pressure in the upper cylinder chamber 2a reaches the valve opening pressure for the main disk valve 22 (when the piston operates at high speed, in the high speed range of the piston speed), the main disk valve 22 opens, to thereby permit a flow of the hydraulic fluid directly from the extension-stroke fluid passage 13 to the lower cylinder chamber 2b. It should be noted that the hydraulic fluid in a volume corresponding to that of the portion of the piston rod 8 which has escaped from the cylinder 2 flows from the reservoir 4 to the lower cylinder chamber 2b though the check valve 19 in the fluid passage 17 of the base valve 12.

By this arrangement, before the main disk valve 22 opens (in the low speed range of the piston speed), a damping force is generated by the fixed orifice 27 and the extension-stroke pressure control valve 30. As mentioned above, in the fluid chamber 52 in the extension-stroke pressure control valve 30, the pressure-receiving area $A_2$ of the sub disk valve 54 is greater than the pressure-receiving area $A_1$ of the stepped portion 71 of the slider 51. Due to this difference in area for receiving axial pressure, a thrust is generated of the slider 51 in a direction for opening the sub disk valve 54. In this instance, by operating the proportional solenoid 58 so as to bias the slider 51 in a direction for closing the sub disk valve 54, the valve opening pressure for the sub disk valve 54 can be adjusted in accordance with the current applied to the coil 73. Thus, a damping force before opening of the main disk valve 22 (in the low speed range of the piston speed) can be directly controlled, regardless of the piston speed.

Further, by adjusting the valve opening pressure for the sub disk valve 54, the pressure in the back pressure chamber 22A is also adjusted in accordance with the valve opening pressure for the sub disk valve 54. As mentioned above, the pressure in the back pressure chamber 22A is applied in the direction for closing the main disk valve 22 as a pilot pressure. Therefore, the valve opening pressure for the main disk valve 22 can be adjusted simultaneously with adjusting the valve opening pressure for the sub disk valve 54, thus making it possible to control a damping force for the low speed range of the piston speed and a damping force for the high speed range of the piston speed at the same time.

During a compression stroke of the piston rod 8, the check valve 19 in the base valve 12 is closed and the hydraulic fluid in the lower cylinder chamber 2b is pressurized under movement of the piston 5. In this instance, before the main disk valve 34 of the damping force generating mechanism 16 opens (in the low speed range of the piston speed), the hydraulic fluid flows from the lower cylinder chamber 2b to the upper cylinder chamber 2a through the compression-stroke fluid passage 14, the fixed orifice 40 of the main disk valve 34, the back pressure chamber 39, the fluid passage 41, the compression-stroke pressure control valve 43, the fluid passage 42, the check valve 44 and the fluid passage 45. When the pressure in the lower cylinder chamber 2b reaches the valve opening pressure for the main disk valve 34 (in the high speed range of the piston speed), the main disk valve 34 opens, to thereby permit a flow of the hydraulic fluid directly from the compression-stroke fluid passage 14 to the upper cylinder chamber 2a. It should be noted that the hydraulic fluid in a volume corresponding to that of the portion of the piston rod 8 which has entered the cylinder 2 flows from the lower cylinder chamber 2b to the reservoir 4 through the disk valve 20 in the fluid passage 18 of the base valve 12.

By this arrangement, before the main disk valve 34 opens (in the low speed range of the piston speed), a damping force is generated by the fixed orifice 40 and the compression-stroke pressure control valve 43. In the fluid chamber 53 in the compression-stroke pressure control valve 43, the pressure-receiving area $A_2$ of the sub disk valve 55 is greater than the pressure-receiving area $A_1$ of the stepped portion 72 of the slider 51. Due to this difference in pressure-receiving area, a thrust is generated in the slider 51 in a direction for opening the sub disk valve 55. In this instance, by operating the proportional solenoid 58 so as to bias the slider 51 in a direction for closing the sub disk valve 55, the valve opening pressure for the sub disk valve 55 can be adjusted in accordance with the current applied to the coil 73. Thus, a damping force before opening of the main disk valve 34 (in the low speed range of the piston speed) can be directly controlled, regardless of the piston speed.

By adjusting the valve opening pressure for the sub disk valve 55, the pressure in the back pressure chamber 39 is also adjusted in accordance with the valve opening pressure for the sub disk valve 55. The pressure in the back pressure chamber 39 is applied in the direction for closing the main disk valve 34 as a pilot pressure. Therefore, the valve opening pressure for the main disk valve 34 can be adjusted simultaneously with adjusting the valve opening pressure for the sub disk valve 55, thus making it possible to control a damping force for the low speed range of the piston speed and a damping force for the high speed range of the piston speed at the same time.

Thus, the damping force can be controlled over a wide range of piston speed. By virtue of the extension-stroke and compression-stroke pressure control valves 30 and 43, an appropriate damping force due to the valve characteristics can be obtained even when the piston is operating at low speed. This avoids the problem of an insufficient damping force being generated when the piston is operating at low speed, and an excessive increase in damping force when the piston is operating at high speed. Further, when the pressure in the back pressure chambers 22A and 39 sharply increases due to sudden transmission of a large force due to the vehicle encountering a bump on a road surface, the sub disk valves 54 and 55 in the extension-stroke and compression-stroke pressure control valves 30 and 43 are caused to deflect and outer peripheral portions of the sub disk valves are separated from the valve seats 49 and 50. Consequently, the hydraulic fluid in the back pressure chambers 22A and 39 rapidly flows into the fluid chambers 63 and 66, thereby suppressing a sharp rise in damping force and improving ride quality. The sub disk valves 54 and 55 have a large opening area relative to the separation from the valve seats, as compared to conventional poppet valves. Therefore, the slider 51 is required to travel only a small distance (generally about 0.5 mm), leading to a high degree of responsiveness.

The damping force is controlled according to the balance between the thrust generated in the slider 51 (due to the difference in pressure-receiving area between the stepped portion 71 or 72 of the slider 51 and the sub disk valve 54 or 55 in the fluid chamber 52 or 53) and the thrust of the proportional solenoid 58. By increasing the difference in pressure-receiving area, the load applied to the proportional solenoid 58 can be reduced, leading to a reduction in size and weight of the solenoid. Further, because the damping force is controlled directly by opening and closing the sub disk valves 54 and 55 as a pressure control valve, an effect of dimensional tolerances of valve members can be suppressed, as compared to that in the case of using a variable orifice. Therefore, a stable damping force can be obtained.

The slider 51 is capable of attaining a position for opening both the sub disk valves 54 and 55 (for effecting soft damping during the extension stroke and the compression stroke) and a position for closing one of the sub disk valves 54 and 55 while the other sub disk valve is opened (for effecting soft damping during the extension stroke and hard damping during the compression stroke or for effecting hard damping during the extension stroke and soft damping during the compression stroke), in accordance with the current applied to the coil 73 of the proportional solenoid 58. Therefore, it is possible to vary damping force characteristics in opposite directions between the extension stroke and the compression stroke, which is suitable for effecting semi-active suspension control, based on a so-called skyhook theory.

Figure 4:
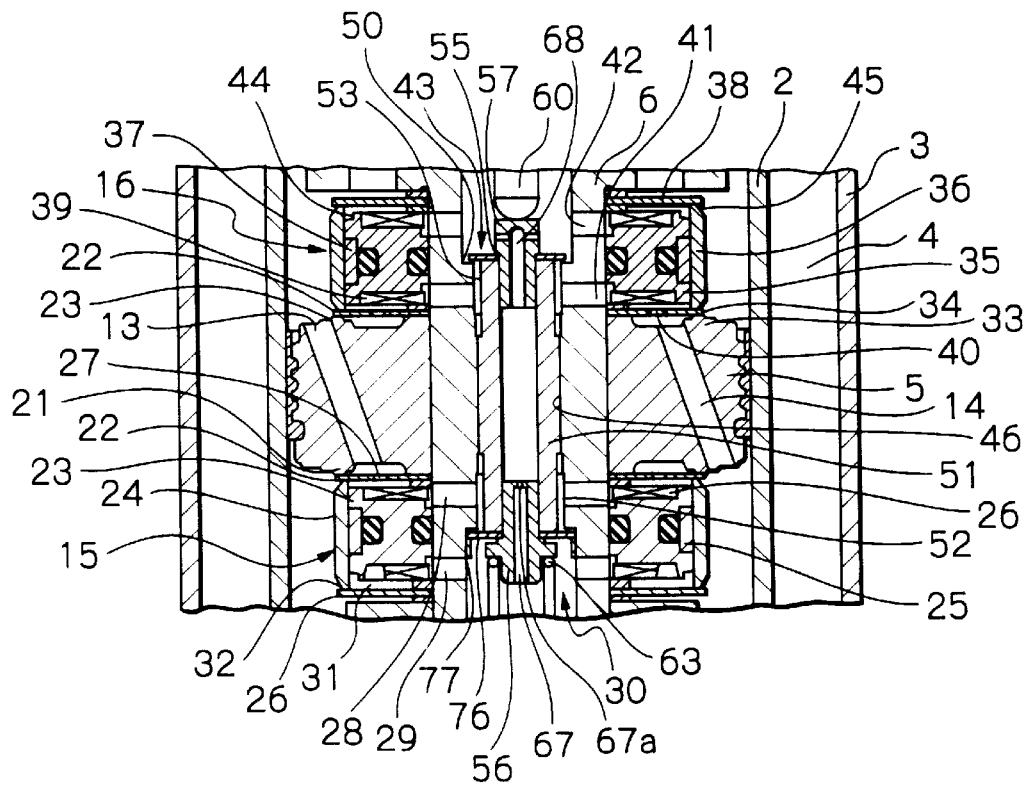
FIG. 4 is an enlarged vertical cross-sectional view showing an essential part of a first modified example of the hydraulic shock absorber in the first embodiment of the present invention.

FIG. 4 shows a first modified example of the first embodiment of the present invention. In the extension-stroke pressure control valve 30 in FIG. 4, instead of the sub disk valve 54, a sub disk valve 76 is attached, by a retainer ring 77, to the stepped portion between the small-diameter bore 46 and the large-diameter bore 47 of the piston bolt 6. The end portion of the slider 51 is separably seated over the sub disk valve 76, to thereby enable opening and closing of the sub disk valve 76. In this example also, the damping force during the extension stroke and the damping force during the compression stroke are varied in a direction from soft damping to hard damping and in a direction from hard damping to soft damping, respectively, in accordance with the current applied to the proportional solenoid.

Next, a second embodiment of the present invention will be described, with reference to FIGS. 5 and 6. In the following description, the same portions as those in the first embodiment are referred to only briefly.

Figure 5:
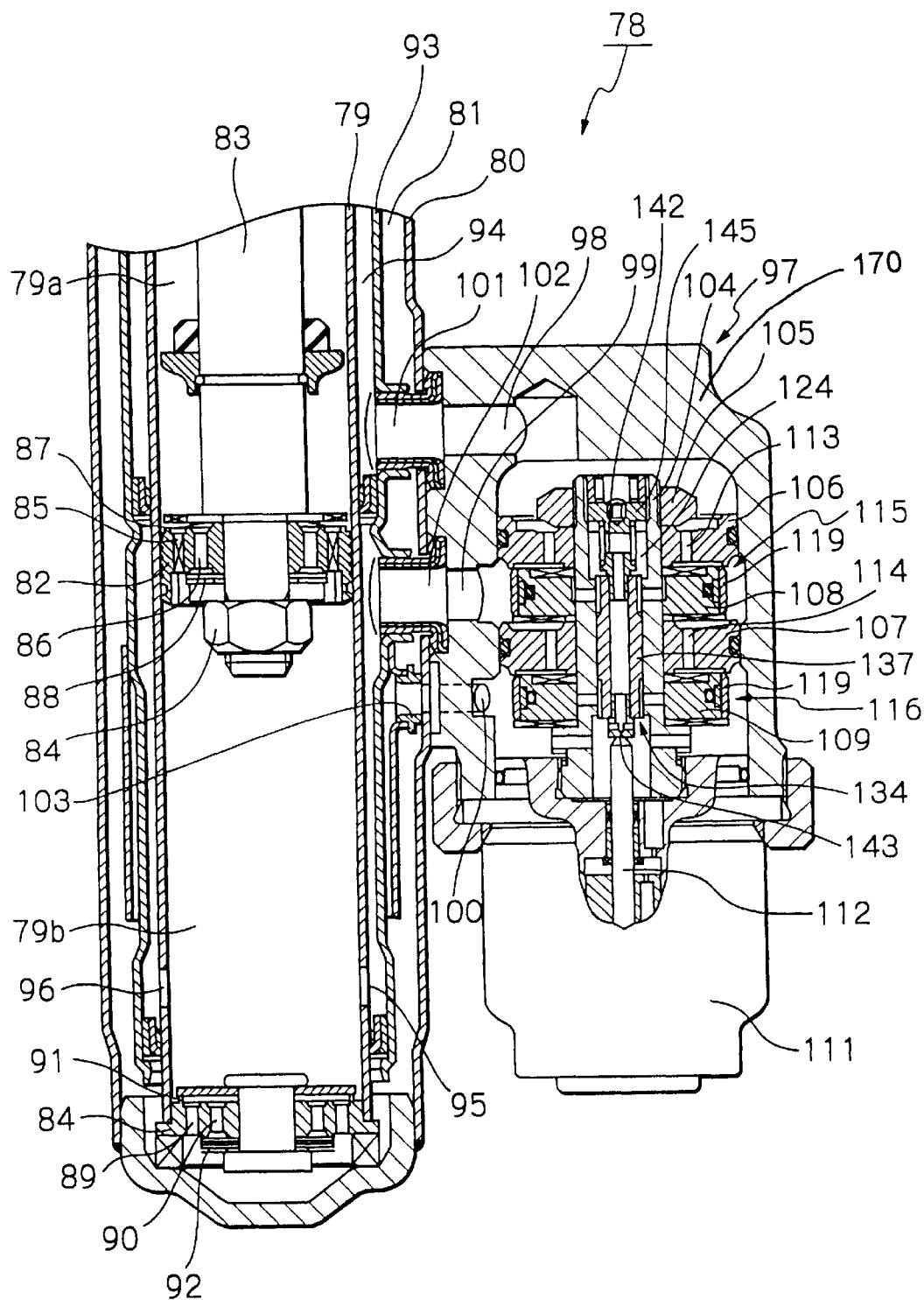
FIG. 5 is a vertical cross-sectional view showing an essential part of a damping force control type hydraulic shock absorber in a second embodiment of the present invention.

As shown in FIG. 5, a damping force control type hydraulic shock absorber 78 in the second embodiment comprises a dual cylinder including an inner cylinder 79 and an outer cylinder 80 provided outside the cylinder 79. A reservoir 81 is formed between the cylinders 79 and 80. A piston 82 is slidably provided in the cylinder 79 so as to divide the interior of the cylinder 79 into an upper cylinder chamber 79a and a lower cylinder chamber 79b. The piston 82 is connected to one end portion of a piston rod 83 by a nut 84. The piston rod 83 on a side opposite the piston 82 extends to the outside of the cylinder 79 through the upper cylinder chamber 79a and a rod guide (not shown) and an oil seal (not shown) provided at an upper end portion of the cylinders 79 and 80. A base valve 84 for separating the lower cylinder chamber 79b and the reservoir 81 is provided at a lower end portion of the cylinder 79. The hydraulic fluid is sealably contained in the cylinder 79. The hydraulic fluid and gas are sealably contained in the reservoir 81.

Fluid passages 85 and 86 are formed in the piston 82 so as to enable communication between the upper cylinder chamber 79a and the lower cylinder chamber 79b. A check valve 87 is provided in the fluid passage 85 so as to permit a flow of the hydraulic fluid only from the lower cylinder chamber 79b to the upper cylinder chamber 79a. A relief valve 88 is provided in the fluid passage 86. When the pressure of the hydraulic fluid in the upper cylinder chamber 79a reaches a predetermined level, the relief valve 88 opens, to thereby permit a flow of the hydraulic fluid from the upper cylinder chamber 79a to the lower cylinder chamber 79b. Fluid passages 89 and 90 are formed in the base valve 84 so as to permit communication between the lower cylinder chamber 79b and the reservoir 81. A check valve 91 is provided in the fluid passage 89 so as to permit a flow of the hydraulic fluid only from the reservoir 81 to the lower cylinder chamber 79b. A relief valve 92 is provided in the fluid passage 90. When the pressure of the hydraulic fluid in the lower cylinder chamber 79b reaches a predetermined level, the relief valve 92 opens, to thereby permit a flow of the hydraulic fluid from the lower cylinder chamber 79b to the reservoir 81.

A generally cylindrical passage member 93 is provided so as to surround an outer circumferential surface of the cylinder 79 and form annular fluid passages 94 and 95 between the cylinder 79 and the passage member 93. The annular fluid passage 94 is communicated with the upper cylinder chamber 79a through a fluid passage (not shown) formed in a side wall of the cylinder 79 in the vicinity of the upper end portion thereof. The annular fluid passage 95 is communicated with the lower cylinder chamber 79b through a fluid passage 96 formed in the side wall of the cylinder 79 in the vicinity of the lower end portion thereof. A damping force generating mechanism 97 is attached to a side wall of the outer cylinder 80. Three connecting ports 98, 99 and 100 formed in a case 170 of the damping force generating mechanism 97 are, respectively, connected through connecting pipes 101, 102 and 103 to the annular fluid passages 94 and 95 and the reservoir 81.

Figure 6:
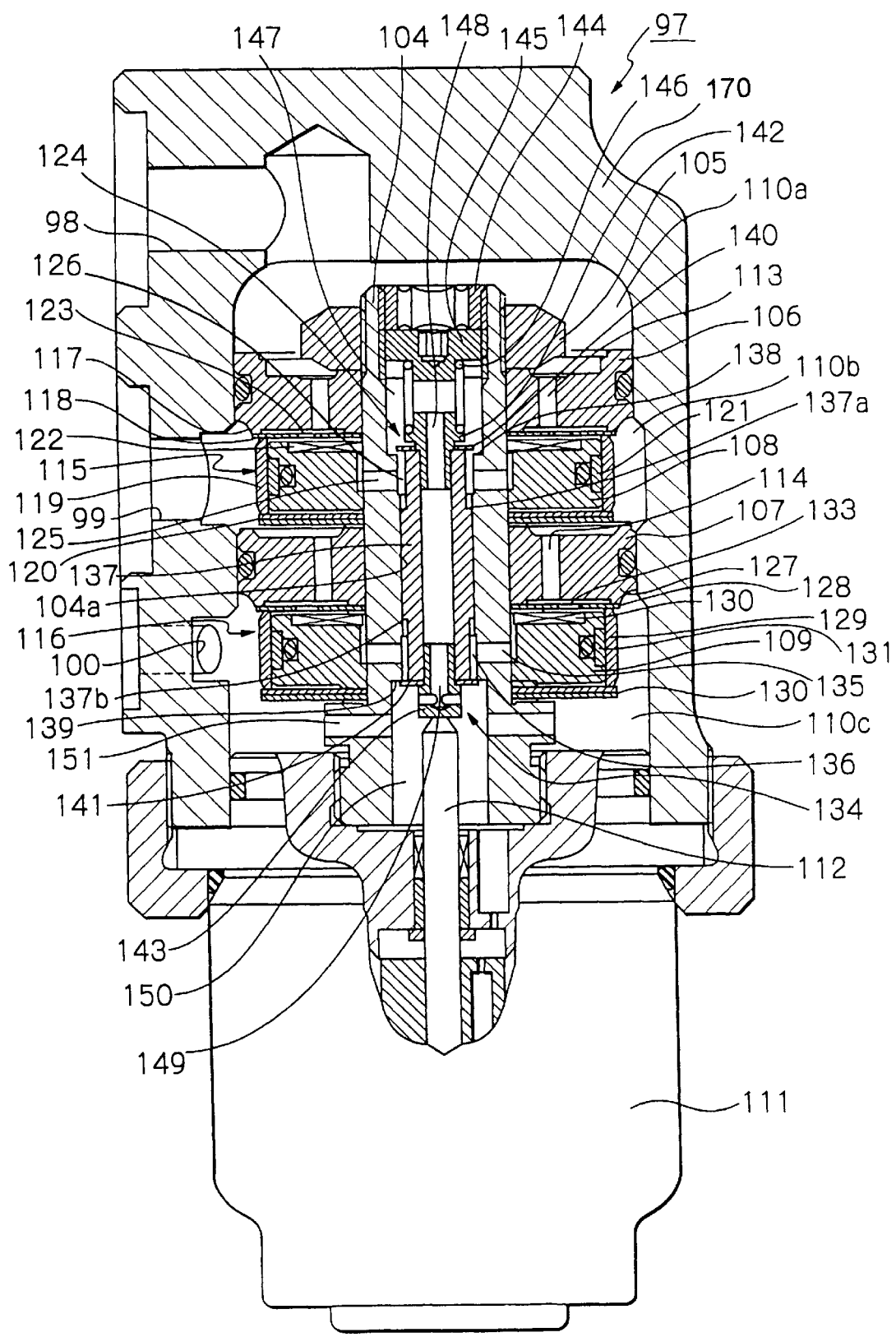
FIG. 6 is an enlarged vertical cross-sectional view showing a damping force generating mechanism of the hydraulic shock absorber of FIG. 5.

As shown in FIG. 6, the damping force generating mechanism 97 comprises two valve bodies 106 and 107 and two fixing members 108 and 109 disposed adjacent to the valve bodies 106 and 107, respectively. The valve bodies 106 and 107 and the fixing members 108 and 109 are connected as a unit by using a nut 105, while a sleeve 104 is extended therethrough. The valve bodies 106 and 107 are fitted into the case 170 in a generally cylindrical form with one end being closed. A proportional solenoid actuator 111 (hereinafter, referred to simply as "the actuator 111") is attached to an opening of the case 170. Thus, the valve bodies 106 and 107 divide the interior of the case 110 into three fluid chambers 110a, 110b and 110c communicated with the connecting ports 98, 99 and 100, respectively. The sleeve 104 is threadably engaged with the actuator 111. An operating rod 112 of the actuator 111 is inserted into the sleeve 104.

An extension-stroke fluid passage 113 is formed in the valve body 106 so as to enable communication between the fluid chambers 110a and 110b. A compression-stroke fluid passage 114 is formed in the valve body 107 so as to enable communication between the fluid chambers 110b and 110c. The fixing members 108 and 109 disposed adjacent to the valve bodies 106 and 107 have an extension-stroke damping force generating mechanism 115 and a compression-stroke damping force generating mechanism 116 provided therein.

The extension-stroke damping force generating mechanism 115 comprises an annular valve seat 117 formed in the valve body 106, a main disk valve 118, a movable ring 119, a leaf spring 120, a slide ring 121, a back pressure chamber 122, a fixed orifice 123 and an extension-stroke pressure control valve 124. The back pressure chamber 122 is communicated through a fluid passage 125 in the sleeve 104 with a valve chamber 126 of the extension-stroke pressure control valve 124. The compression-stroke damping force generating mechanism 116 comprises an annular valve seat 127 formed in the valve body 107, a main disk valve 128, a movable ring 129, a leaf spring 130, a slide ring 131, a back pressure chamber 130, a fixed orifice 133 and a compression-stroke pressure control valve 134. The back pressure chamber 130 is communicated through a fluid passage 135 in the sleeve 104 with a valve chamber 136 of the compression-stroke pressure control valve 134.

A cylindrical slider 137 is provided in a small-diameter bore 104a of the sleeve 104. In the extension stroke and compression-stroke pressure control valves 124 and 134, sub disk valves 140 and 141 which are separably seated over valve seats 138 and 139 of the sleeve 104 are attached to opposite end portions of the slider 137 by retainers 142 and 143. An adjusting plug 145 is threadably engaged with a distal end portion of the sleeve 104 and fixed by a lock nut 144. The slider 137 is resiliently held under a force generated by a compression spring 146 provided between the adjusting plug 145 and the retainer 142 and a compression spring (not shown) for pressing a rear end portion of the operating rod 112 of the actuator 111 which abuts against the retainer 143. Due to a difference in pressure-receiving area between a stepped portion 137a or 137b of the slider 137 and the sub disk valve 140 or 141 in the valve chamber 126 or 136, the pressure in the valve chamber 126 or 136 generates thrust for the slider 137 in a valve opening direction.

A fluid chamber 147 disposed downstream of the extension-stroke pressure control valve 124 in the sleeve 104 is communicated with a fluid chamber 150 disposed downstream of the compression-stroke pressure control valve 134 through fluid passages 148 and 149 formed in the retainers 142 and 143 and the interior of the slider 137, and is further communicated through the fluid chamber 150 and a fluid passage 151 in the sleeve 104 with the fluid chamber 110c.

Hereinbelow, description is made with regard to an operation of the damping force control type hydraulic shock absorber in the second embodiment.

During an extension stroke of the piston rod 83, in accordance with movement of the piston 82, the check valve 87 in the fluid passage 85 of the piston 82 closes and the hydraulic fluid in the upper cylinder chamber 79a is pressurized. Before the main disk valve 118 opens, the hydraulic fluid flows from the upper cylinder chamber 79a through the annular fluid passage 94 and the connecting pipe 101 to the connecting port 98 of the damping force generating mechanism 97 and further flows into the reservoir 81 through the fluid chamber 110a, the extension-stroke fluid passage 113, the fixed orifice 123, the back pressure chamber 122, the fluid passage 125, the extension-stroke pressure control valve 124, the fluid chamber 147, the fluid passage 148, the fluid passage 149, the fluid chamber 150, the fluid passage 151, the fluid chamber 110c, the connecting port 100 and the connecting pipe 103. The check valve 91 on the base valve 84 opens and the hydraulic fluid flows from the reservoir 81 through the fluid passage 89 to the lower cylinder chamber 79b. When the pressure in the upper cylinder chamber 79a reaches the valve opening pressure for the main disk valve 118, the main disk valve 118 opens, so that the hydraulic fluid flows directly from the extension-stroke fluid passage 113 to the fluid chamber 110b and further flows into the lower cylinder chamber 79b through the connecting port 99, the connecting pipe 102, the annular fluid passage 95 and the fluid passage 96.

By this arrangement, during the extension stroke, before the main disk valve 118 opens (in the low speed range of the speed), a damping force is generated by the fixed orifice 123 and the extension-stroke pressure control valve 124. When the pressure in the upper cylinder chamber 79a increases and the main disk valve 118 opens (in the high speed range of the piston speed), a damping force is generated in accordance with the degree of opening of the main disk valve 118. In this instance, in accordance with the current applied to the coil of the actuator 111, the valve opening pressure for the sub disk valve 140 can be adjusted, based on the difference in the pressure-receiving areas in the valve chamber 126. Thus, a damping force before opening of the main disk valve 118 (in the low speed range of the piston speed) is directly controlled by adjusting the valve opening pressure for the sub disk valve 140. At the same time, because the pressure in the back pressure chamber 122 is adjusted by adjusting the valve opening pressure for the sub disk valve 140, the valve opening pressure for the main disk valve 118 (a damping force for the high speed range of the piston speed) is also controlled.

During a compression stroke of the piston rod 83, in accordance with movement of the piston 82, the check valve 87 in the piston 82 opens, so that the hydraulic fluid in the lower cylinder chamber 79b directly flows into the upper cylinder chamber 79a through the fluid passage 85. Consequently, the pressure in the upper cylinder chamber 79a and the pressure in the lower cylinder chamber 79b become substantially equal, so that no flow of the hydraulic fluid occurs between the connecting ports 98 and 99 of the damping force generating mechanism 97. The check valve 91 on the base valve 84 closes following entry of the piston rod 83 into the cylinder 79, and the hydraulic fluid in the cylinder 79 is pressurized in relation to the volume of the portion of the piston rod 83 which has entered the cylinder 79. Before opening of the main disk valve 128, the hydraulic fluid flows from the lower cylinder chamber 79b to the connecting port 99 of the damping force generating mechanism 97 through the fluid passage 96, the annular fluid passage 95 and the connecting pipe 102, and further flows into the reservoir 81 through the fluid chamber 110b, the compression-stroke fluid passage 114, the fixed orifice 133, the back pressure chamber 130, the fluid passage 135, the compression-stroke pressure control valve 134, the fluid chamber 150, the fluid passage 151, the fluid chamber 110c, the connecting port 100 and the connecting pipe 103. When the pressure in the cylinder 79 reaches the valve opening pressure for the main disk valve 128, the main disk valve 128 opens, to thereby permit a flow of the hydraulic fluid directly from the compression-stroke fluid passage 114 to the fluid chamber 110c.

By this arrangement, during the compression stroke, before the main disk valve 128 opens (in the low speed range of the piston speed), a damping force is generated by the fixed orifice 133 and the compression-stroke pressure control valve 134. When the pressure in the cylinder 79 increases and the main disk valve 128 opens (in the high speed range of the piston speed), a damping force is generated in accordance with the degree of opening of the main disk valve 128. In this instance, in accordance with the current applied to the coil of the actuator 111, the valve opening pressure for the sub disk valve 141 can be adjusted, based on the difference in the pressure-receiving areas in the valve chamber 136. Thus, a damping force before opening of the main disk valve 128 (in the low speed range of the piston speed) is directly controlled by adjusting the valve opening pressure for the sub disk valve 141. At the same time, because the pressure in the back pressure chamber 130 is adjusted by adjusting the valve opening pressure for the sub disk valve 141, the valve opening pressure for the main disk valve 128 (a damping force for the high speed range of the piston speed) is also controlled.

Thus, in the second embodiment, the same effect as that of the first embodiment can be achieved. Further, when the valve structure is changed to a structure such as shown in FIG. 4 (in the first modified example of the first embodiment), a damping force during the extension stroke and a damping force during the compression stroke can be varied in a direction from soft damping to hard damping and in a direction from hard damping to soft damping, respectively, in accordance with the current applied to the proportional solenoid.

Figure 7:
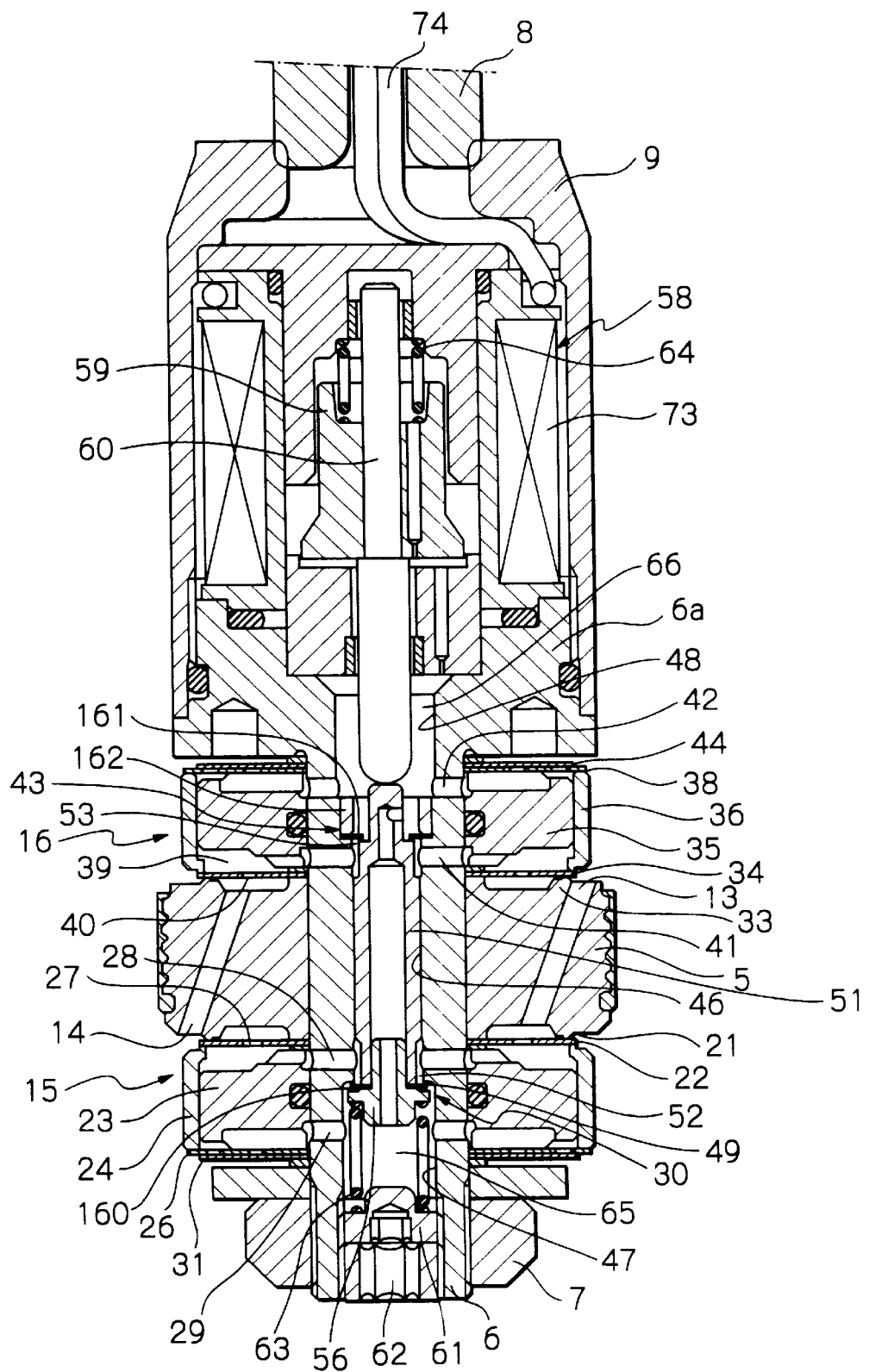
FIG. 7 is an enlarged vertical cross-sectional view showing an essential part of a second modified example of the hydraulic shock absorber in the first embodiment of the present invention.

FIG. 7 shows a second modified example of the first embodiment of the present invention. The second modified example is substantially the same as the first modified example shown in FIG. 4, except that the structures of the extension-stroke pressure control valve 30 and the compression-stroke pressure control valve 43 are changed. Therefore, in FIG. 7, the same portions as those shown in FIG. 4 are designated by the same reference numerals and characters, and only the portions different from those in FIG. 4 are described below in detail.

In the second modified example, as shown in FIG. 7, a sub disk valve 160 in the extension-stroke pressure control valve 30 is attached to the slider 51 by a retainer 56. The sub disk valve 160 is separably seated over a valve seat 49 so as to move to and away from the valve seat 49 in accordance with movement of the slider 51. A sub disk valve 161 in the compression-stroke pressure control valve 43 is attached by a retainer ring 162, to the stepped portion of the piston bolt 6 between the large-diameter bore 48 and the small-diameter bore 46. The end portion (stepped portion) of the slider 51 is separably seated over the sub disk valve 161. The slider 51 is biased toward the proportional solenoid 58 (in an upward direction in FIG. 7) under the force generated by the springs 63 and 64, so that the extension-stroke and compression-stroke pressure control valves 30 and 43 are closed when the proportional solenoid 58 is not energized.

By this arrangement, the damping force during the extension stroke and the damping force during the compression stroke can be varied in the same direction from soft damping to hard damping or from hard damping to soft damping, in accordance with the current applied to the proportional solenoid 58. As mentioned above, when the proportional solenoid 58 is not energized, both the extension-stroke pressure control valve 30 and the compression-stroke pressure control valve 43 are closed. Therefore, in the event of failure of energization of the proportional solenoid 58, both a damping force during the extension stroke and a damping force during the compression stroke are set to hard damping, thus enabling secure steering stability in the event of failure.

As has been described above in detail, in the damping force control type hydraulic shock absorber of the present invention, the valve opening pressure for the pressure control valve is adjusted by virtue of a thrust of a solenoid, to thereby directly control the hydraulic pressure before opening of the pilot type damping valve, while the pilot pressure is varied in accordance with controlled pressure of the pressure control valve, to thereby adjust the valve opening pressure for the pilot type damping valve. In this instance, the pressure control valve generates an axial thrust of the slider, due to a difference in the pressure-receiving areas in the valve chamber for receiving a pressure acting in a direction of the axis of the slider. The valve opening pressure is adjusted according to the balance between the thrust of the slider and the thrust of the solenoid, to thereby control the damping force. Consequently, the damping force can be controlled over a wide range and an appropriate damping force due to the valve characteristics can be obtained even when the piston is operating at low speed. Further, a stable damping force can be obtained without being influenced by temperature changes. In addition, by reducing the difference in the pressure-receiving areas in the valve chamber, the load applied to the solenoid can be reduced, leading to a reduction in size and weight of the solenoid.

It should be noted that as compared to conventional damping force control type hydraulic shock absorbers, the first embodiment of the present invention undergoes or is capable of undergoing some improvements such as those mentioned below (although the below-mentioned improvements have no direct relation to the above-mentioned characteristics of the first embodiment of the present invention).

Referring to FIG. 1, the piston rod 8 is connected to the solenoid case 9 in a manner such as mentioned below. First, the piston rod 8 is positioned (centered) relative to the solenoid case 9 by bringing a lower end portion of the piston rod 8 into contact with the solenoid case 9. In this state, the piston rod 8 is fixed by being welded to the solenoid case 9. Thereafter, in order to ensure a high degree of coaxiality between the solenoid case 9 and the piston rod 8, the piston rod 8 is held by a lathe, and an inner circumferential surface of the solenoid case 9 is machined. By this arrangement, a high degree of coaxiality between the piston rod 8 and the piston 5 can be obtained, thereby reducing wear of the piston 5 and an inner circumferential surface of the cylinder 2, leading to high durability.

Further, a seal 110 for a radial bias is provided between a fixed iron core 101 and a coil bobbin 100 at an upper portion of the coil bobbin 100, while a seal 111 for an axial bias is provided between the large-diameter portion 6a of the piston bolt 6 and the coil bobbin 100 at a lower portion of the coil bobbin 100. The seal 110 and the seal 111 resiliently support the coil bobbin 100 radially and axially, while hermetically sealing a space between the fixed iron core 101 and the coil bobbin 100 and a space between the coil bobbin 100 and the large-diameter portion 6a of the piston bolt 6. By this arrangement, variations in dimensional tolerances of members such as the coil bobbin 100 and the fixed iron core 101 can be absorbed. Further, when the members such as the coil bobbin 100 contract due to, for example, a lowering of temperature, displacement or play of the coil bobbin 100 in the solenoid case 9 either in an axial direction or in a radial direction can be prevented. Leakage of the hydraulic fluid in a direction from the plunger 59 to the coil 73 can be prevented. Generation of pronounced noise and risk of damage to the lead wire can also be avoided. Further, a stable damping force can be obtained.

The seals 110 and 111 are provided at a position outside a path of magnetic flux generated by the coil 73. Therefore, there is no possibility that the thrust of the proportional solenoid 58 will become undesirably small due to the presence of the seals 110 and 111.

In addition, the seals 110 and 111 are provided at axially upper and lower positions (outside positions) relative to the portion of the coil bobbin 100 wound with the coil 73. Therefore, the diameter of the coil 73 is not affected by the seals 110 and 111, and there is no possibility that the thrust of the proportional solenoid 58 will become undesirably small due to the presence of the seals 110 and 111. Therefore, this arrangement can be suitably applied even when the coil is increased in diameter (the thrust of the proportional solenoid is increased) or when the damping force control type hydraulic shock absorber is decreased in diameter (the freedom of design is ensured).

Conventionally, the coil bobbin 100 is inserted into the solenoid case 9 and then the piston bolt 6 is threadably engaged with and fixed to the solenoid case. In this case, the coil bobbin 100 is likely to rotate in the solenoid case 9 and impart damage to the harness or lead wire 74. In the present invention, rotation of the coil bobbin 100 in the solenoid case 9 may be prevented by forming a recess in the solenoid case 9 and a protrusion on the coil bobbin 100 and fitting the protrusion into the recess. By this arrangement, even when the piston bolt 6 is threadably engaged with the solenoid case 9 by a predetermined torque, rotation of the coil bobbin 100 relative to the solenoid case 9 can be surely prevented, so that a connection failure of the wiring harness can also be surely prevented.

In the above-mentioned embodiments, when the main disk valve is increased in diameter and the position at which the main disk valve makes contact with the movable ring is shifted radially outward so that the effect of the pilot pressure is increased and the main disk valve is biased in the valve closing direction by application of a larger force, the following problem occurs. Namely, during reverse flow of the hydraulic fluid, the pilot type damping valve (the main disk valve) is subject to a pressure acting in the valve opening direction (for example, during the extension stroke, the main disk valve for the compression stroke is subject to a pressure acting in the valve opening direction, while during the compression stroke, the main disk valve for the extension stroke is subject to a pressure acting in the valve opening direction). Therefore, the main disk valve is likely to be separated from the surface of the valve seat during reverse flow of the hydraulic fluid, leading to the occurrence of irregularities in a waveform of damping force characteristics.

A third embodiment of the present invention is described below. The third embodiment is free from the above-mentioned problem. In the third embodiment, the portions which are not specifically described are the same as those stated in the first embodiment. The same portions as those stated in the first embodiment are designated by the same reference numerals and characters and explanation thereof is omitted.

Figure 8:
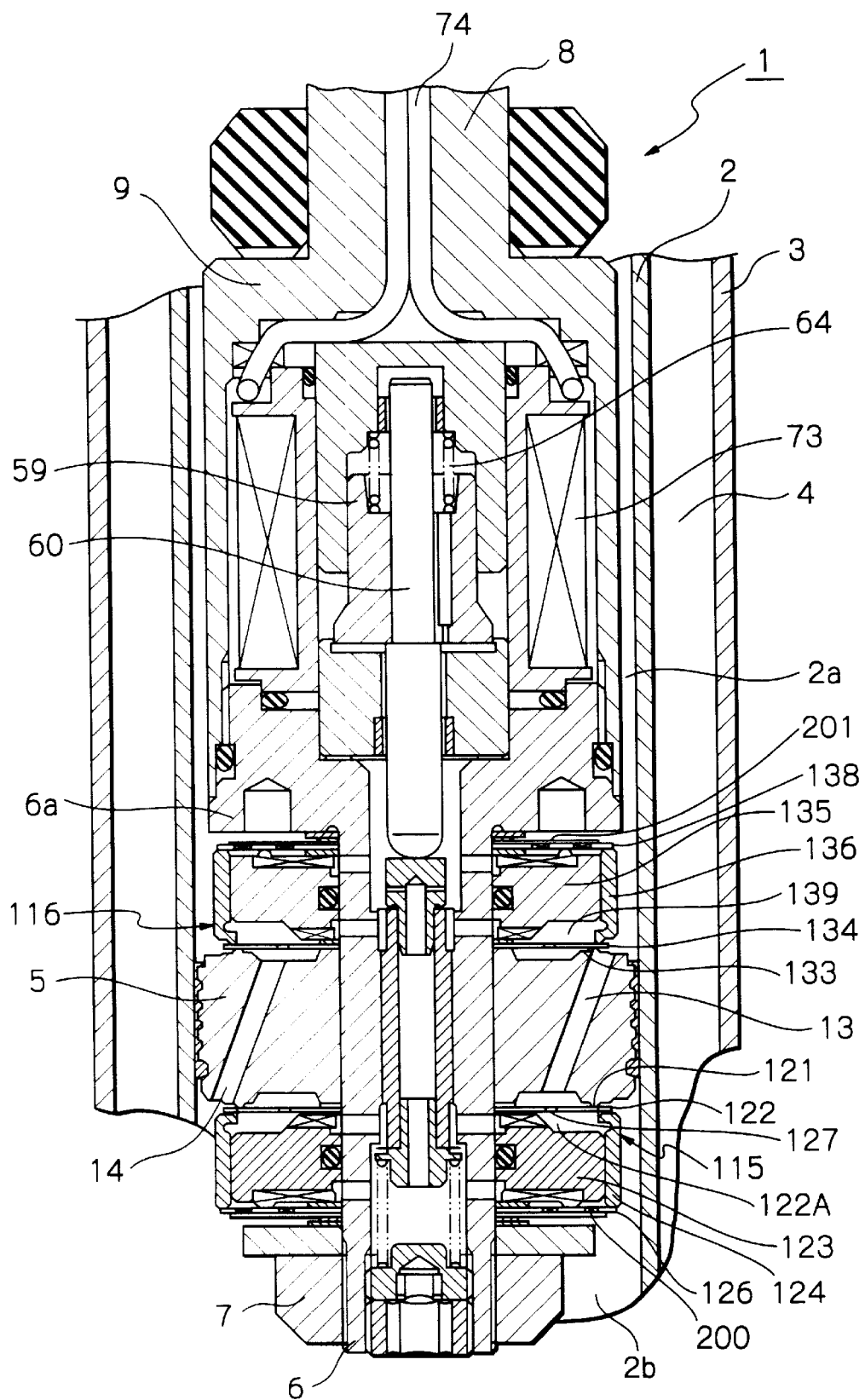
FIG. 8 is an enlarged vertical cross-sectional view showing an essential part of a damping force control type hydraulic shock absorber in a third embodiment of the present invention.
Figure 9:
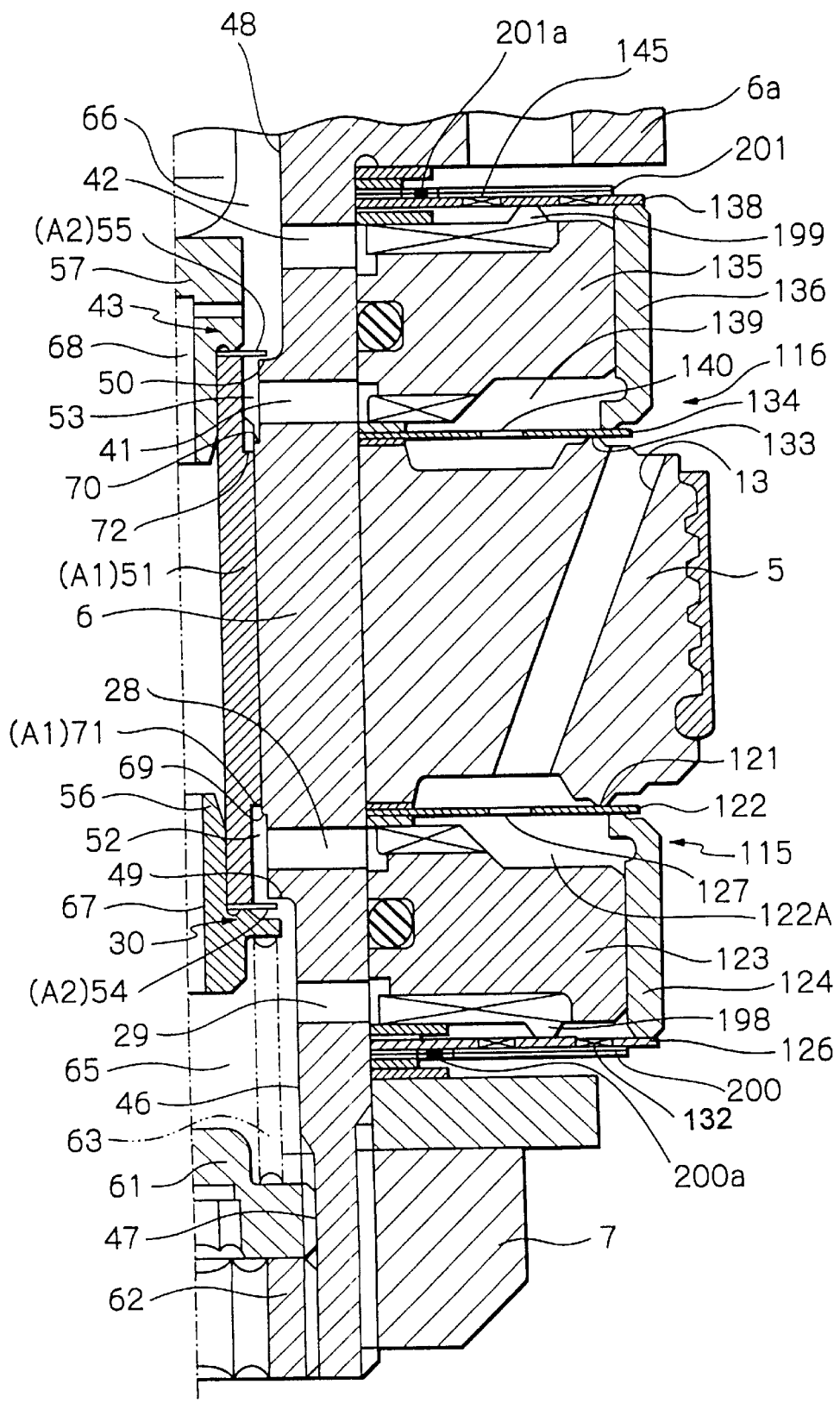
FIG. 9 is a partially enlarged view of FIG. 8.

First, the extension-stroke damping force generating mechanism 115 is described. Referring to FIGS. 8 and 9, a protruding annular valve seat 121 having a predetermined outer diameter is formed on an end surface of the piston 5 on a side of the lower cylinder chamber 2b. A main disk valve (pilot type damping valve) 122 is separably seated on the valve seat 121. An annular valve member 123 having an outer diameter which is larger than the outer diameter of the valve seat 121 is connected to the piston bolt 6 between the piston 5 and the nut 7. A generally cylindrical slide member 124 is slidably fitted onto an outer circumferential surface of the valve member 123. The slide member 124 abuts against the main disk valve 122 by virtue of a disk member 126 clamped between the valve member 123 and the nut 7. The disk member 126 resiliently biases the main disk valve 122 through the slide member 124 in a valve closing direction.

Figure 10:
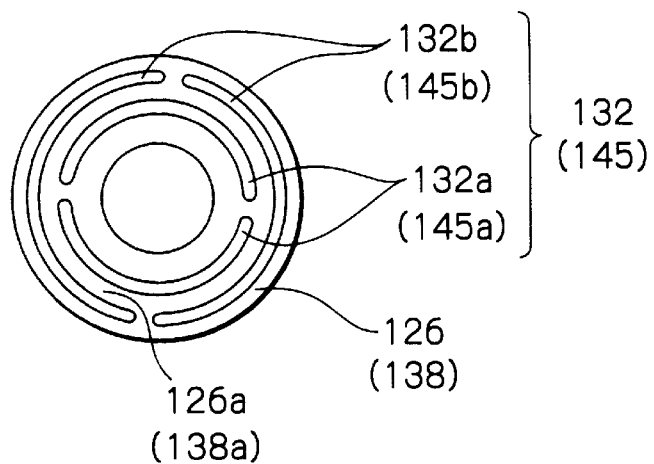
FIG. 10 is a plan view of a disk member shown in FIGS. 8 and 9.

As shown in FIG. 10, a plurality of arcuate openings 132 are formed in the disk member 126 so as to extend along the circumferences of concentric circles. The openings 132 comprise a plurality of first openings 132a (two in this embodiment) having the same predetermined radius of curvature and a plurality of second openings 132b (two in this embodiment) having the same predetermined radius of curvature which is larger than the radius of curvature of the first openings 132a.

A generally annular protrusion (or a discontinuous annular protrusion) 198 is formed on the valve member 123 so as to face portions 126a intervening between the first openings 132a and the second openings 132b in the disk member 126.

Figure 11:
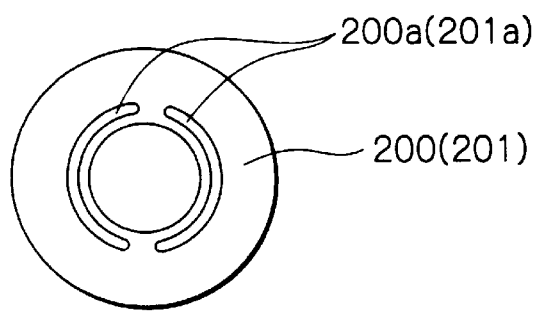
FIG. 11 is a plan view of a check valve shown in FIGS. 8 and 9.
Figure 12:
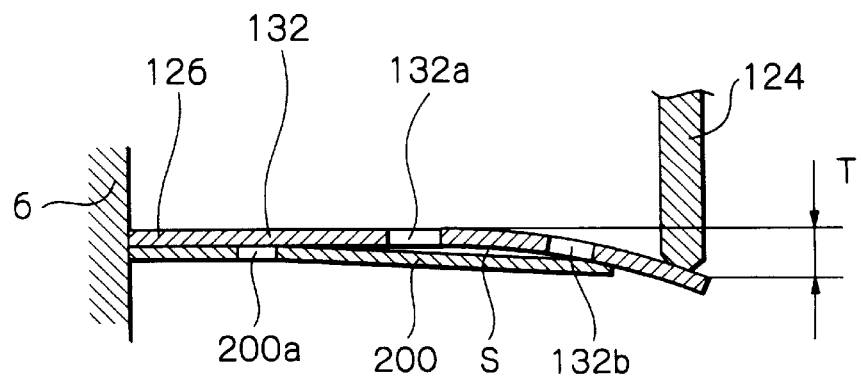
FIG. 12 is a cross-sectional view schematically showing how the disk member of FIG. 10 and the check valve of FIG. 11 are assembled.

As shown in FIGS. 10 and 12, a check valve 200 in the form of a generally circular plate is stacked on the surface of the disk member 126 on a side remote from the valve member 123 (the back surface of the disk member 126). The check valve 200 biases the main disk valve 122 in the valve closing direction through the disk member 126 and the slide member 124. As shown in FIG. 11, the check valve 200 includes arcuate openings 200a and an outer peripheral portion of the check valve 200 relative to the openings 200a is bendable. The disk member 126 is imparted, in an initial set position thereof, with a deflection T of about 20 to 50 μm as shown in FIG. 12. Due to the deflection T, a set load for the main disk valve 122 is obtained and the outer peripheral portion of the check valve 200 is caused to bend, so that a gap S is formed between the outer peripheral portion of the check valve 200 and the disk member 126.

A back pressure chamber 122A is formed between the main disk valve 122 and the valve member 123. An internal pressure of the back pressure chamber 122A acts in a direction for closing the main disk valve 122. The back pressure chamber 122A is communicated with the extension-stroke fluid passage 13 through a fixed orifice 127 formed in the main disk valve 122. Further, the back pressure chamber 122A is communicated with the side of the valve member 123 remote from the back pressure chamber 122A (the back side of the valve member 123 or a lower side in FIG. 8) through the fluid passages 28 and 29 in the side wall of the piston bolt 6 and the extension-stroke pressure control valve (cross-section adjusting valve) 30 formed within the piston bolt 6. The back pressure chamber 122A is further communicated with the lower cylinder chamber 2b through the openings 132 of the disk member 126, the gap S and the openings 200a of the check valve 200.

Next, the compression-stroke damping force generating mechanism 116 is described. A protruding annular valve seat 133 having a predetermined outer diameter is formed on an end surface of the piston 5 on a side of the upper cylinder chamber 2a. A main disk valve (pilot type damping valve) 134 is separably seated on the valve seat 133. An annular valve member 135 having an outer diameter which is larger than the outer diameter of the valve seat 133 is connected to the piston bolt 6 between the large-diameter portion 6a and the piston 5. A slide member 136 is slidably fitted onto an outer circumferential surface of the valve member 135. The slide member 136 abuts against the main disk valve 134 by virtue of a disk member 138 clamped between the valve member 135 and the large-diameter portion 6a. The disk member 138 resiliently biases the main disk valve 134 through the slide member 136 in a valve closing direction.

As shown in FIG. 10, a plurality of arcuate openings 145 are formed in the disk member 138 so as to extend along the circumferences of concentric circles. The openings 145 comprise a plurality of first openings 145a (two in this embodiment) having the same predetermined radius of curvature and a plurality of second openings 145b (two in this embodiment) having the same predetermined radius of curvature which is larger than the radius of curvature of the first openings 145a.

A generally annular protrusion (or a discontinuous annular protrusion) 199 is formed on the valve member 135 so as to face portions 138a intervening between the first openings 145a and the second openings 145b in the disk member 138.

As shown in FIGS. 9 and 10, a check valve 201 in the form of a generally circular plate is stacked on the surface of the disk member 138 on a side remote from the valve member 135 (the back surface of the disk member 138). The check valve 201 biases the main disk valve 134 in the valve closing direction through the disk member 138 and the slide member 136. As shown in FIG. 11, the check valve 201 includes arcuate openings 201a and an outer peripheral portion of the check valve 201 relative to the openings 201a is bendable. The disk member 138 is imparted, in an initial set position thereof, with the deflection T (see FIG. 12), as in the case of the disk member 126. Due to the deflection T, a set load for the main disk valve 134 is obtained and the outer peripheral portion of the check valve 201 is caused to bend, so that the gap S (see FIG. 12) is formed between the outer peripheral portion of the check valve 201 and the disk member 138.

A back pressure chamber 139 is formed between the main disk valve 134 and the valve member 135. An internal pressure of the back pressure chamber 139 acts in a direction for closing the main disk valve 134. The back pressure chamber 139 is communicated with the compression-stroke fluid passage 14 through a fixed orifice 140 formed in the main disk valve 134. Further, the back pressure chamber 139 is communicated with the side of the valve member 135 remote from the back pressure chamber 139 (the back side of the valve member 135 or an upper side in FIG. 8) through the fluid passages 41 and 42 in the side wall of the piston bolt 6 and the compression-stroke pressure control valve (cross-section adjusting valve) 43 formed within the piston bolt 6. The back pressure chamber 139 is further communicated with the upper cylinder chamber 2a through the openings 145 of the disk member 138, the gap S and the openings 201a of the check valve 201.

Hereinbelow, description is made with regard to an operation of the damping force control type hydraulic shock absorber in the third embodiment.

During the extension stroke of the piston rod 8, the hydraulic fluid in the upper cylinder chamber 2a is pressurized under movement of the piston 5. In this instance, before the main disk valve 122 of the extension-stroke damping force generating mechanism 115 opens (in the low speed range of the piston speed), the hydraulic fluid flows from the upper cylinder chamber 2a to the lower cylinder chamber 2b through the extension-stroke fluid passage 13, the fixed orifice 127 of the main disk valve 122, the back pressure chamber 122A, the fluid passage 28, the extension-stroke pressure control valve 30, the fluid passage 29, the openings 132, the gap S and the openings 200a of the check valve 200. When the pressure in the upper cylinder chamber 2a reaches the valve opening pressure for the main disk valve 122 (the high speed range of the piston speed), the main disk valve 122 opens, to thereby permit a flow of the hydraulic fluid directly from the extension-stroke fluid passage 13 to the lower cylinder chamber 2b. It should be noted that the hydraulic fluid in a volume corresponding to that of the portion of the piston rod 8 which has escaped from the cylinder 2 flows from the reservoir 4 to the lower cylinder chamber 2b through the check valve 19 in the fluid passage 17 of the base valve 12.

By this arrangement, before the main disk valve 122 opens (in the low speed range of the piston speed), a damping force is generated by the fixed orifice 127 and the extension-stroke pressure control valve 30. In the fluid chamber 52 in the extension-stroke pressure control valve 30, the pressure-receiving area $A_2$ of the sub disk valve 54 is greater than the pressure-receiving area $A_1$ of the stepped portion 71 of the slider 51. Due to this difference in area for receiving axial pressure, a thrust is generated in the slider 51 in a direction for opening the sub disk valve 54. In this instance, by operating the proportional solenoid 58 so as to bias the slider 51 in a direction for closing the sub disk valve 54, the valve opening pressure for the sub disk valve 54 can be adjusted in accordance with the current applied to the coil 73. Thus, a damping force before opening of the main disk valve 122 (in the low speed range of the piston speed) can be directly controlled, regardless of the piston speed.

By adjusting the valve opening pressure for the sub disk valve 54, the pressure in the back pressure chamber 122A is also adjusted in accordance with the valve opening pressure for the sub disk valve 54. As mentioned above, the pressure in the back pressure chamber 122A is applied in the direction for closing the main disk valve 122 as a pilot pressure. Therefore, the valve opening pressure for the main disk valve 122 can be adjusted simultaneously with adjusting the valve opening pressure for the sub disk valve 54, thus making it possible to control a damping force for the low speed range of the piston speed and a damping force for the high speed range of the piston speed at the same time.

As mentioned above, in the extension-stroke damping force generating mechanism 115, use is made of the annular valve member 123 having the outer diameter which is larger than the outer diameter of the valve seat 121 on which the main disk valve 122 is separably seated. During the extension stroke of the piston rod 8, with respect to the main disk valve 122 and valve member 123 (hence the slide member 124 fitted onto the valve member 123) of the extension-stroke damping force generating mechanism 115, the hydraulic fluid applies a larger force in the direction for closing the main disk valve 122 than in a direction for opening the main disk valve 122. Therefore, even when the set load of the disk member 126 for the valve 122 is nearly zero, a large damping force can be generated for hard damping during the extension stroke, thus enabling control of a damping force over a wide range.

On the other hand, during reverse flow of the hydraulic fluid relative to the extension-stroke damping force generating mechanism 115 (namely, during the compression stroke), with respect to the main disk valve 122 and valve member 123 (hence the slide member 124 fitted onto the valve member 123), the hydraulic fluid acts in the direction for opening the main disk valve 122, thus generating a force which tends to cause separation of the main disk valve 122 from the valve seat 121. This force is canceled by the biasing force of the disk member 126 and check valve 200 and the pressure of the hydraulic fluid in the lower cylinder chamber 2b acting on the check valve 200. Therefore, separation of the main disk valve 122 can be prevented.

Further, as mentioned above, the protrusion 198 is formed on the valve member 123. During the reverse flow relative to the extension-stroke damping force generating mechanism 115 (namely, during the compression stroke), the protrusion 198 abuts against the disk member 126 to thereby restrict deflection of the disk member 126. Therefore, breakage of the disk member 126 can be surely prevented.

During the compression stroke of the piston rod 8, in accordance with movement of the piston 5, the check valve 19 on the base valve 12 closes and the hydraulic fluid in the lower cylinder chamber 2b is pressurized. In this instance, before the main disk valve 134 of the compression-stroke damping force generating mechanism 116 opens (in the low speed range of the piston speed), the hydraulic fluid flows from the lower cylinder chamber 2b to the upper cylinder chamber 2a through the compression-stroke fluid passage 14, the fixed orifice 140 of the main disk valve 134, the back pressure chamber 139, the fluid passage 41, the compression-stroke pressure control valve 43, the fluid passage 42, the openings 145, the gap S and the openings 201a of the check valve 201. When the pressure in the lower cylinder chamber 2b reaches the valve opening pressure for the main disk valve 134 (the high speed range of the piston speed), the main disk valve 134 opens, to thereby permit a flow of the hydraulic fluid directly from the compression-stroke fluid passage 14 to the upper cylinder chamber 2a. It should be noted that the hydraulic fluid in a volume corresponding to that of the portion of the piston rod 8 which has entered the cylinder 2 flows from the lower cylinder chamber 2b to the reservoir 4 through the disk valve 20 in the fluid passage 18 of the base valve 12.

By this arrangement, before the main disk valve 134 opens (in the low speed range of the piston speed), a damping force is generated by the fixed orifice 140 and the compression-stroke pressure control valve 43. In the fluid chamber 53 in the compression-stroke pressure control valve 43, the pressure-receiving area $A_2$ of the sub disk valve 55 is greater than the pressure-receiving area $A_1$ of the stepped portion 72 of the slider 51. Due to this difference in pressure-receiving area, a thrust is generated in the slider 51 in a direction for opening the sub disk valve 55. In this instance, by operating the proportional solenoid 58 so as to bias the slider 51 in a direction for closing the sub disk valve 55, the valve opening pressure for the sub disk valve 55 can be adjusted in accordance with the current applied to the coil 73. Thus, a damping force before opening of the main disk valve 134 (in the low speed range of the piston speed) can be directly controlled, regardless of the piston speed.

By adjusting the valve opening pressure for the sub disk valve 55, the pressure in the back pressure chamber 139 is also adjusted in accordance with the valve opening pressure for the sub disk valve 55. The pressure in the back pressure chamber 139 is applied in the direction for closing the main disk valve 134 as a pilot pressure. Therefore, the valve opening pressure for the main disk valve 134 can be adjusted simultaneously with adjusting the valve opening pressure for the sub disk valve 55, thus making it possible to control a damping force for the low speed range of the piston speed and a damping force for the high speed range of the piston speed at the same time.

As mentioned above, in the compression-stroke damping force generating mechanism 116, use is made of the annular valve member 135 having the outer diameter which is larger than the outer diameter of the valve seat 133 on which the main disk valve 134 is separably seated. During the compression stroke of the piston rod 8, with respect to the main disk valve 134 and valve member 135 (hence the slide member 136 fitted onto the valve member 135) of the compression-stroke damping force generating mechanism 116, the hydraulic fluid applies a larger force in the direction for closing the main disk valve 134 than in a direction for opening the main disk valve 134. Therefore, even when the set load of the disk member 138 for the valve 134 is nearly zero, a large damping force can be generated for hard damping during the compression stroke, thus enabling control of a damping force over a wide range.

On the other hand, during reverse flow of the hydraulic fluid relative to the compression-stroke damping force generating mechanism 116 (namely, during the extension stroke), with respect to the main disk valve 134 and valve member 135 (hence the slide member 136 fitted onto the valve member 135), the hydraulic fluid acts in the direction for opening the main disk valve 134, thus generating a force which tends to cause separation of the main disk valve 134 from the valve seat 133. This force is canceled by the biasing force of the disk member 138 and check valve 201 and the pressure of the hydraulic fluid in the upper cylinder chamber 2a acting on the check valve 201. Therefore, separation of the main disk valve 134 can be prevented.

Further, as mentioned above, the protrusion 199 is formed on the valve member 135. During the reverse flow relative to the compression-stroke damping force generating mechanism 116 (namely, during the extension stroke), the protrusion 199 abuts against the disk member 138 to thereby restrict deflection of the disk member 138. Therefore, breakage of the disk member 138 can be surely prevented.

Thus, it is possible to control a damping force over a wide range of piston speed. By setting the outer diameters of the valve members 123 and 135 as being larger than those of the valve seats 121 and 133, the range of controlling a damping force can be further increased. By virtue of the extension-stroke and compression-stroke pressure control valves 30 and 43, an appropriate damping force due to the valve characteristics can be obtained even when the piston is operating at low speed. This avoids the problem of an insufficient damping force being generated when the piston is operated at low speed and an excessive increase in damping force when the piston is operating at high speed. Further, when the pressure in the back pressure chambers 122A and 139 sharply increases due to sudden transmission of a large force due to the vehicle encountering a bump on a road surface, the sub disk valves 54 and 55 in the extension-stroke and compression-stroke pressure control valves 30 and 43 are caused to deflect and outer peripheral portions of the sub disk valves are separated from the valve seats 49 and 50. Consequently, the hydraulic fluid in the back pressure chambers 122A and 139 rapidly flows into the fluid chambers 63 and 66, thereby suppressing a sharp rise in damping force and improving ride quality.

In this embodiment, the cross-section adjusting valve is the pressure control valve. However, a cross-section adjusting valve of a flow rate control type may be used, instead of the pressure control valve.

In the third embodiment of the present invention, the outer diameter of the valve member is set as being larger than the diameter of the valve seat on which the pilot type damping valve is separably seated. By this arrangement, during normal flow relative to the pilot type damping valve (for example, the extension stroke), with respect to the pilot type damping valve and valve member (hence the slide member fitted onto the valve member), the hydraulic fluid acts in a direction for closing the pilot type damping valve. Therefore, even when the set load of the disk member for the pilot type damping valve is substantially zero, a large damping force can be generated during the extension stroke, thus increasing the range of controlling a damping force.

On the other hand, during reverse flow relative to the same pilot type damping valve (for example, during the compression stroke), with respect to the pilot type damping valve and valve member (hence the slide member fitted onto the valve member), the hydraulic fluid acts in a direction for opening the pilot type damping valve, thus generating a force which tends to cause separation of the pilot type damping valve from the valve seat. This force is canceled, however, due to the effect of the biasing force generated by the disk member and check valve and the hydraulic pressure in the lower cylinder chamber acting on the check valve. Therefore, separation of the pilot type damping valve can be prevented.

In the above-mentioned embodiments, in the low speed range of the piston speed, a damping force is generated, depending on the restriction of the orifice in the fluid passage, so that damping force characteristics can be widely varied. However, in the medium or high speed range of the piston speed, a damping force is dependent on the degree of opening of the damping force generating mechanism (such as the disk valve) in the main fluid passage, so that it is difficult to enable damping force characteristics to be widely varied. Therefore, when the damping force is set to soft damping, a problem occurs, such that the damping force in the relatively high speed range of the piston speed is insufficient.

The below-mentioned fourth to sixth embodiments of the present invention are free from this problem.

Figure 13:
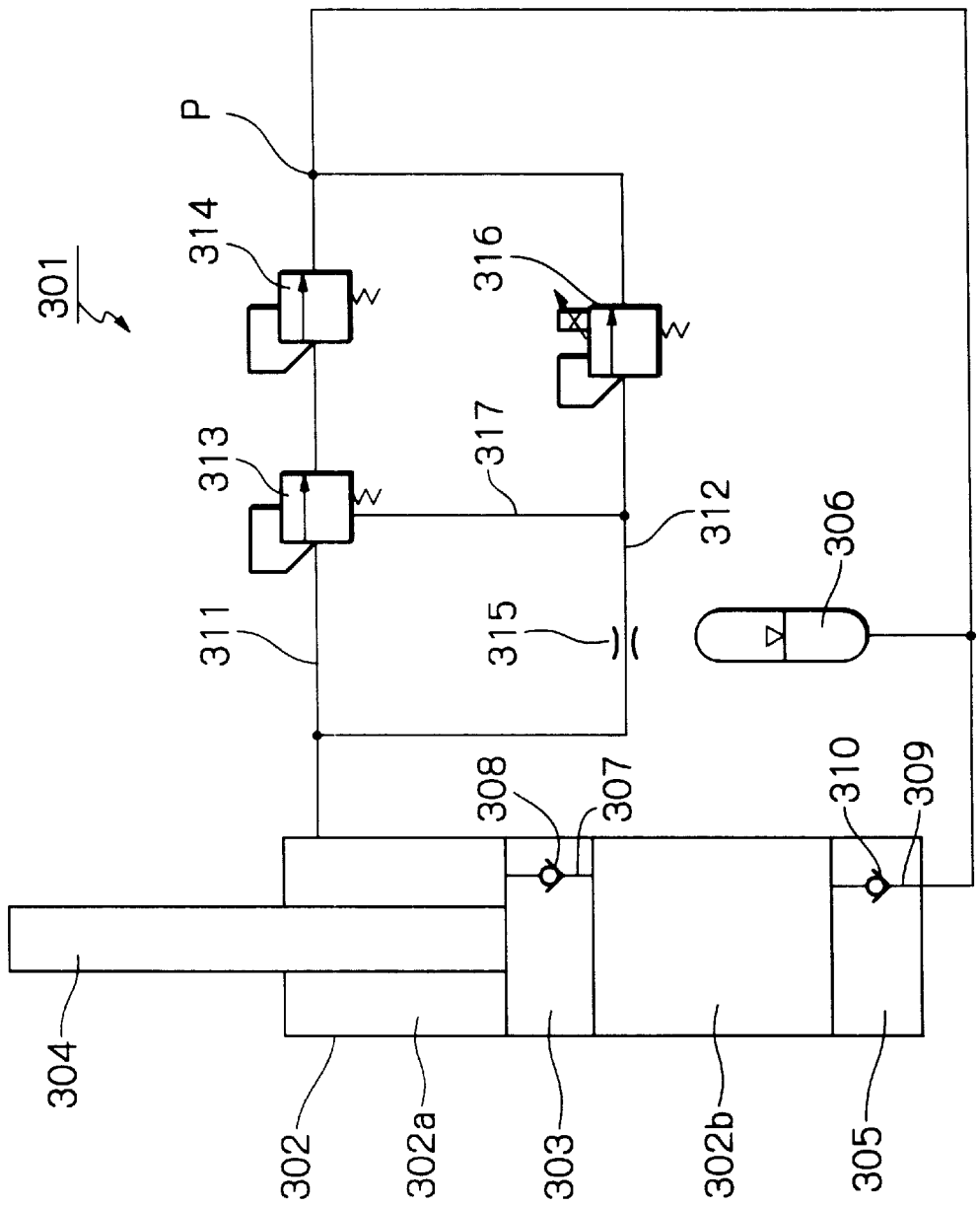
FIG. 13 is a circuit diagram showing a general construction of a damping force control type hydraulic shock absorber in a fourth embodiment of the present invention.

The fourth embodiment of the present invention will be described below, with reference to FIG. 13. As shown in FIG. 13, a damping force control type hydraulic shock absorber 301 in the third embodiment comprises a cylinder 302 in which a hydraulic fluid is sealably contained and a piston 303 slidably provided in the cylinder 302. The piston 303 divides the interior of the cylinder 302 into an upper cylinder chamber 302a and a lower cylinder chamber 302b. One end portion of a piston rod 304 is connected to the piston 303. The piston rod 304 on a side opposite the piston 303 extends to the outside of the cylinder 302 through the upper cylinder chamber 302a. A reservoir 306 is connected to the lower cylinder chamber 302b through a base valve 305 provided at the bottom of the cylinder 302.

The piston 303 includes a fluid passage 307 enabling communication between the upper and lower cylinder chambers 302a and 302b and a check valve 308 provided in the fluid passage 307 for permitting a flow of the hydraulic fluid only from the lower cylinder chamber 302b to the upper cylinder chamber 302a. The base valve 305 includes a fluid passage 309 enabling communication between the lower cylinder chamber 302b and the reservoir 306 and a check valve 310 provided in the fluid passage 309 for permitting a flow of the hydraulic fluid only from the reservoir 306 to the lower cylinder chamber 302b.

The upper cylinder chamber 302a is connected to the reservoir 306 through a main passage 311 and a sub passage 312 disposed in parallel to each other. A main valve (a pilot type damping valve) 313 is provided in the main passage 311 as a pilot type pressure control valve and a sub valve (a sub damping valve) 314 is provided downstream of the main valve 313. Consequently, in FIG. 13, the sub valve 314 is disposed at a position downstream of the main valve 313 and upstream of a junction P of the main passage 311 and the sub passage 312. The sub passage 312 includes a fixed orifice 315 and also includes a pilot valve (a variable damping valve) 316 provided downstream of the fixed orifice 315 as an electromagnetic pressure control valve. A pilot passage 317 for the main valve 313 is connected to the sub passage 312 between the fixed orifice 315 and the pilot valve 316.

The main valve 313 opens under a pressure of the upstream hydraulic fluid and generates a damping force corresponding to the degree of opening thereof. The valve opening pressure for the main valve 313 is adjusted according to a pilot pressure introduced from the pilot passage 317 into the main valve 313. The sub valve 314 opens under the pressure of the upstream hydraulic fluid and generates a damping force by generating a predetermined differential pressure corresponding to the flow of the hydraulic fluid. The pilot valve 316 opens under the pressure of the upstream hydraulic fluid and generates a predetermined differential pressure according to the flow of the hydraulic fluid. The differential pressure of the pilot valve 316 can be controlled according to the current applied to a solenoid.

Next, an operation of the damping force control type hydraulic shock absorber in the fourth embodiment will be described.

During an extension stroke of the piston rod 304, in accordance with movement of the piston 303, the check valve 308 of the piston 303 closes and the hydraulic fluid in the upper cylinder chamber 302a is pressurized. The hydraulic fluid pressurized in the upper cylinder chamber 302a flows to the reservoir 306 through the fixed orifice 315 and the pilot valve 316 in the sub passage 312. When the pressure in the upper cylinder chamber 302a reaches the valve opening pressure for the main valve 313, the hydraulic fluid flows to the reservoir 306 through the main valve 313 and the sub valve 314 in the main passage 311. The hydraulic fluid in a volume corresponding to that of the portion of the piston rod 304 which has escaped from the cylinder 302 flows from the reservoir 306 through the check valve 310 of the base valve 305 to the lower cylinder chamber 302b.

During a compression stroke of the piston rod 304, in accordance with movement of the piston 303, the check valve 308 of the piston 303 opens and the check valve 310 of the base valve 305 closes. The hydraulic fluid in the lower cylinder chamber 302b flows through the fluid passage 307 to the upper cylinder chamber 302a. The hydraulic fluid in a volume corresponding to that of the portion of the piston rod 304 which has entered the cylinder 302 flows from the upper cylinder chamber 302a to the reservoir 306 through the same passage as used for the extension stroke.

Therefore, during both the extension stroke and the compression stroke, before the main valve 313 opens (in the low speed range of the piston speed), a damping force is generated by virtue of the fixed orifice 315 and the pilot valve 316. After the main valve 313 opens (in the high speed range of the piston speed), a damping force is generated by virtue of the main valve 313 and the sub valve 314. By energizing the solenoid so as to adjust controlled pressure of the pilot valve 316, a damping force before opening of the main valve 313 can be directly controlled, regardless of the piston speed. In this instance, a differential pressure is generated in the sub passage 312 between the upstream side and the downstream side of the pilot valve 316, according to the controlled pressure of the pilot valve 316. When the differential pressure increases, the pilot pressure introduced from the pilot passage 317 into the main valve 313 also increases. Therefore, by adjusting the controlled pressure of the pilot valve 316, the valve opening pressure for the main valve 313 can also be adjusted.

As mentioned above, in the main passage 311, the sub valve 314 is disposed downstream of the main valve 313. Therefore, when the damping force is set to soft damping (when the valve opening pressure for the main valve 313 is low), an appropriate damping force can be obtained by making up for a deficiency in the damping force generated by the main valve 314 (see FIG. 20 ①). When the damping force is set to the type other than soft damping, although the differential pressure of the sub valve 314 tends to increase the pressure on the upstream side of the main valve 313, the pilot pressure for the main valve 313 is controlled, based on the pressure on the downstream side (that is, the pressure on a side of the reservoir 306) which is not affected by the sub valve 314, so that the main valve 313 opens to a degree such that it counteracts the effect of the damping force generated by the sub valve 314. Thus, the damping force can be directly controlled by maintaining it at substantially the same level, according to the controlled pressure of the pilot valve 316, without being affected by the sub valve 314 and the piston speed (see FIG. 20 ②).

Figure 20:
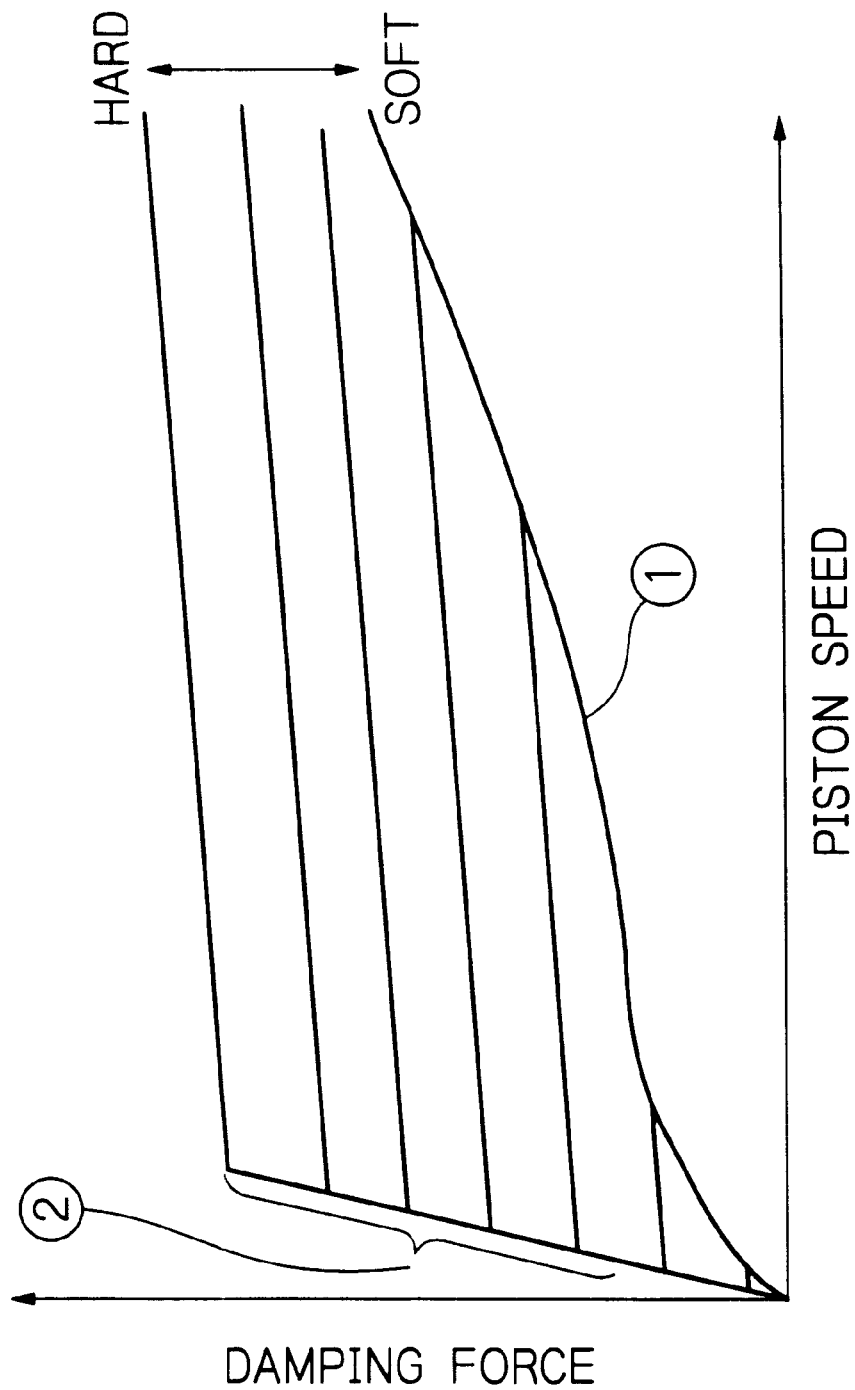
FIG. 20 is a diagram showing damping force characteristics of the hydraulic shock absorber of FIG. 13.

By this arrangement, with respect to soft damping, appropriate damping force characteristics can be set according to the characteristics of the sub valve 314, in conformity to the vehicle weight, the lever ratio and the spring constant of a suspension system, the vehicle characteristics, etc. When the damping force is set to the type other than soft damping, the damping force can be maintained at substantially the same level, regardless of the piston speed, according to the current applied to the solenoid of the pilot valve 316. Therefore, high-precision semi-active damper control can be achieved, without the need for a high degree of responsiveness of a system for detecting and controlling the piston speed. When the damping force is set to the type in the vicinity of soft damping, as shown in FIG. 20, in the high speed of the piston speed, the damping force increases due to the effect of the sub valve 314. Therefore, the damping force necessary for damping vibration of an unsprung mass can be obtained.

In the fourth embodiment, as the variable damping valve, use is made of the pilot valve 316 which is the pressure control valve. This does not limit the present invention. A flow rate control valve can be used in the present invention. When a flow rate control valve is used, damping force characteristics (for soft damping) when the flow rate control valve is open can be appropriately set according to the characteristics of the sub valve.

Figure 14:
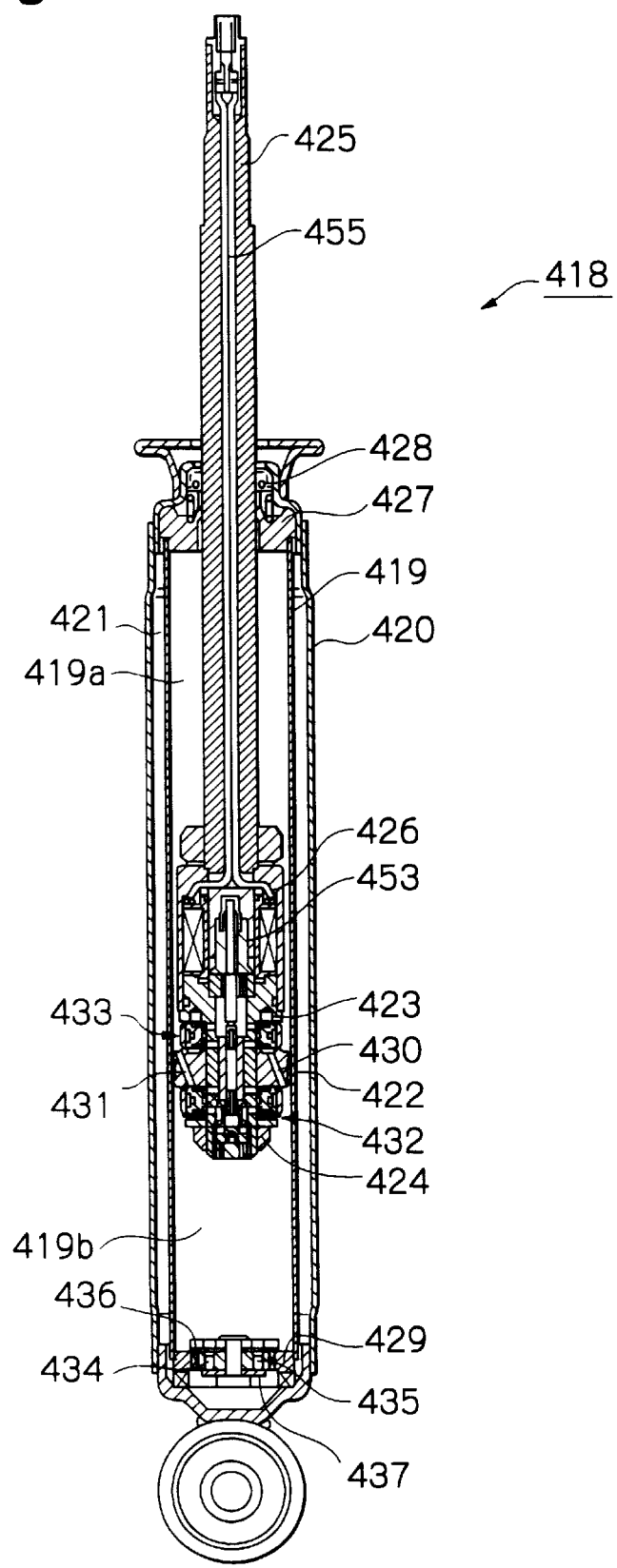
FIG. 14 is a vertical cross-sectional view of a damping force control type hydraulic shock absorber in a fifth embodiment of the present invention.
Figure 15:
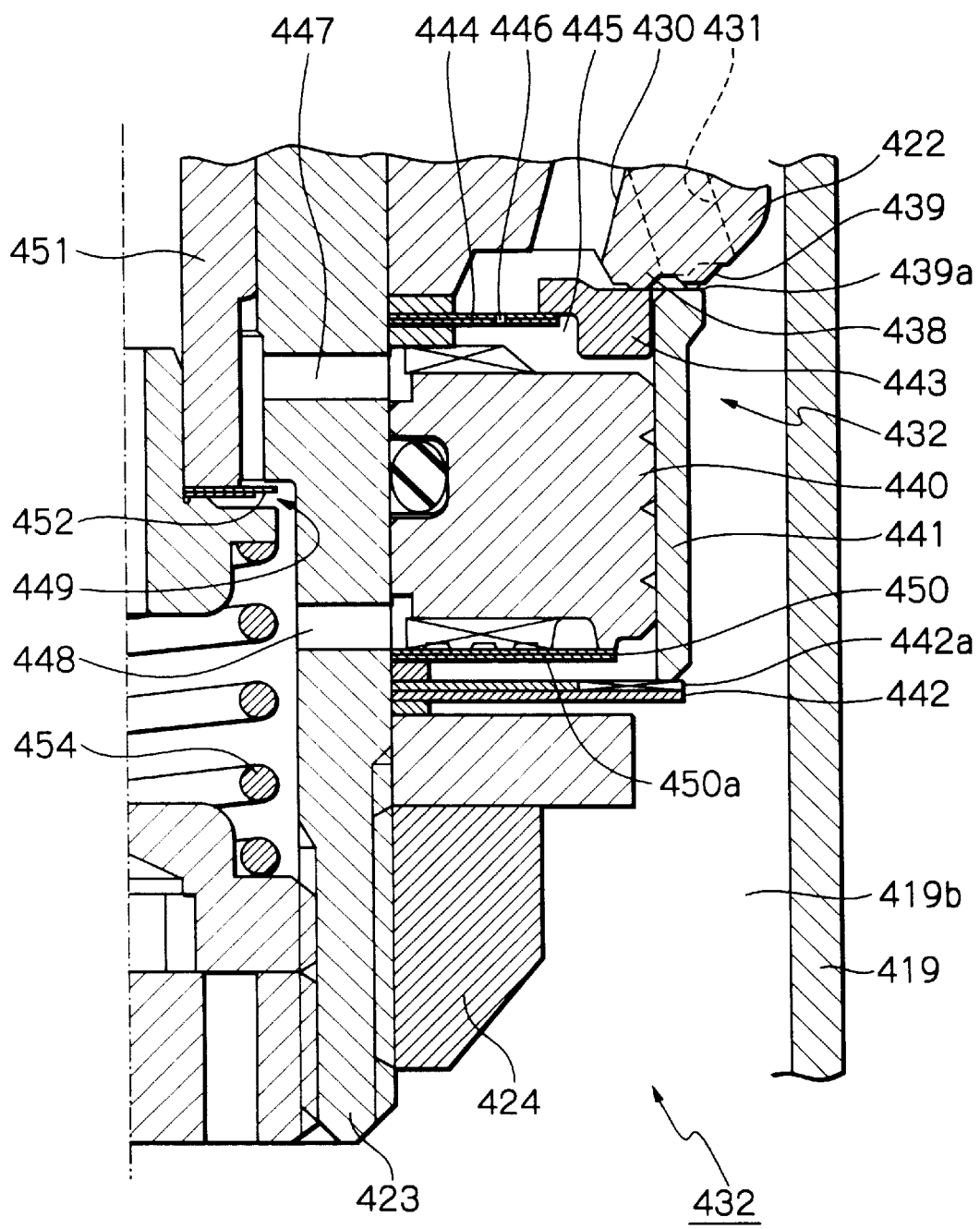
FIG. 15 is an enlarged view of an essential part of FIG. 14.
Figure 16:
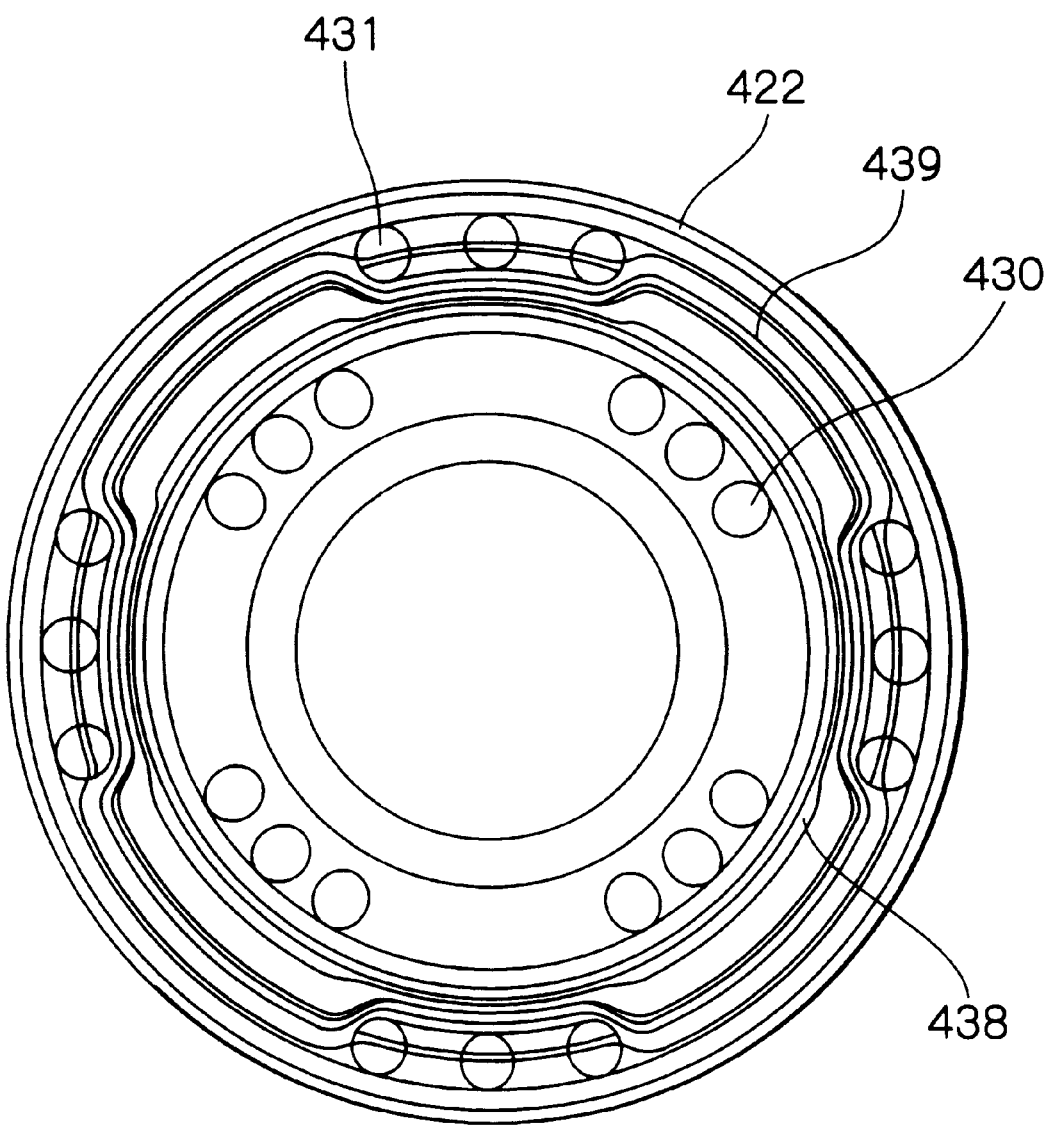
FIG. 16 is a cross-sectional view of the hydraulic shock absorber of FIG. 14.

The fifth embodiment of the present invention will be described, with reference to FIGS. 14 to 16. As shown in FIG. 14, a damping force control type hydraulic shock absorber 418 in the fifth embodiment comprises a dual cylinder including an inner cylinder 419 and an outer cylinder 420 provided outside the cylinder 419. A reservoir 421 is formed between the cylinders 419 and 420. A piston 422 is slidably provided in the cylinder 419 so as to divide the interior of the cylinder 419 into an upper cylinder chamber 419a and a lower cylinder chamber 419b. A generally cylindrical piston bolt 423 extending through the piston 422 is fixed by a nut 424. A proximal end portion of the piston bolt 423 is threadably engaged with a solenoid case 426 formed at one end portion of a piston rod 425. The piston rod 425 on a side opposite the solenoid case 426 extends to the outside of the cylinder 419 through the upper cylinder chamber 419a and a rod guide 427 and an oil seal 428 provided at an upper end portion of the cylinder 419 and outer cylinder 420. A base valve 429 for separating the lower cylinder chamber 419b and the reservoir 421 is provided at a lower end portion of the cylinder 419.

An extension-stroke fluid passage 430 and a compression-stroke fluid passage 431 are formed in the piston 422, so as to enable communication between the upper cylinder chamber 419a and the lower cylinder chamber 419b. An extension-stroke damping force generating mechanism 432 is provided between the piston 422 and the nut 424, so as to control a flow of a hydraulic fluid in the extension-stroke fluid passage 430. A compression-stroke damping force generating mechanism 433 is provided between the piston 422 and the proximal end portion of the piston bolt 423, so as to control a flow of the hydraulic fluid in the compression-stroke fluid passage 431.

Fluid passages 434 and 435 are provided in the base valve 429, so as to enable communication between the lower cylinder chamber 419b and the reservoir 421. A check valve 436 is provided on the base valve 429 so as to permit a flow of the hydraulic fluid only from the reservoir 421 to the lower cylinder chamber 419b. Further, a disk valve 437 is provided on the base valve 429. When a pressure of the hydraulic fluid in the lower cylinder chamber 419b reaches a predetermined level, the disk valve 437 opens, to thereby permit a flow of the hydraulic fluid from the lower cylinder chamber 419b through the fluid passage 435 to the reservoir 421. The hydraulic fluid is sealably contained in the cylinder 419. The hydraulic fluid and a gas having a predetermined pressure are sealably contained in the reservoir 421.

Next, the extension-stroke damping force generating mechanism 432 will be described in detail, with reference to FIGS. 15 and 16. As shown in FIGS. 15 and 16, a protruding annular main valve seat 438 is formed along the outer circumference of an opening of the extension-stroke fluid passage 430 on an end surface of the piston 422 on a side of the lower cylinder chamber 419b. A protruding annular sub valve seat 439 is formed along the outer circumference of the main valve seat 438 on the end surface of the piston 422. An annular fixing member 440 is attached to the piston bolt 423 between the piston 422 and the nut 424. A sub valve member (a sub damping valve) 441 is slidably fitted onto an outer circumferential surface of the fixing member 440. The sub valve member 441 is in a form of a cylinder having an axial length larger than that of the fixing member 440. One end of the sub valve member 441 is seated over the sub valve seat 439 of the piston 422. A disk-like leaf spring 442 clamped between the fixing member 440 and the nut 424 abuts against the other end of the sub valve member 441, to thereby press the sub valve member 441 against the sub valve seat 439. The sub valve seat 439 includes a cut portion formed by coining or the like, thus forming an orifice passage (a sub damping valve) 439a between the sub valve seat 439 and the sub valve member 441.

An annular main valve member (a pilot type damping valve) 443 is provided between the piston 422 and the fixing member 440 and is slidably fitted into the sub valve member 441. An outer peripheral portion on one end of the main valve member 443 is seated over the main valve seat 438 of the piston 422. An inner peripheral stepped portion on the other end of the main valve member 443 abuts against a disk-like leaf spring 444 clamped between the piston 422 and the fixing member 440 and is pressed against the main valve seat 438. A back pressure chamber 445 is formed between the main valve member 443 and leaf spring 444 and the fixing member 440. An internal pressure of the back pressure chamber 445 is applied in a direction for closing the main valve member 443.

The back pressure chamber 445 is communicated with the extension-stroke fluid passage 430 through a fixed orifice 446 formed in the leaf spring 444. Further, the back pressure chamber 445 is communicated through fluid passages 447 and 448 formed in a side wall of the piston bolt 423 with the side of the fixing member 440 remote from the back pressure chamber 445 through an extension-stroke pressure control valve (a variable damping valve) 449, which is provided in the piston bolt 423. The back pressure chamber 445 is also communicated with the lower cylinder chamber 419b through a check valve (or a disk valve) 450 on the fixing member 440 and a fluid passage (a cut portion) 442a in the leaf spring 442. The fixing member 440 includes protrusions and recesses 450a for preventing adhesion at a position of abutment of a disk valve providing the check valve 450.

A proportional solenoid 453 is contained in the solenoid case 426 of the piston rod 425. The extension-stroke pressure control valve 449 is adapted to control the pressure of the hydraulic fluid between the fluid passages 447 and 448 according to the current applied to the proportional solenoid 453, based on the balance between the hydraulic pressure acting on a disk valve 452, which is connected to a slider 451 slidably fitted into the piston bolt 423, the thrust of the proportional solenoid 453 and the spring force of a return spring 454. The current is applied to the proportional solenoid 453 through a lead wire 455 (see FIG. 14) extending to the outside through the piston rod 425 having a hollow structure.

The compression-stroke damping force generating mechanism 433 has the same structure as the extension-stroke damping force generating mechanism 432. The compression-stroke damping force generating mechanism 433 is adapted to control the hydraulic pressure according to the current applied to the proportional solenoid 453 and generate a damping force relative to the flow of the hydraulic fluid in the compression-stroke fluid passage 431, based on the controlled hydraulic pressure. Therefore, detailed explanation of the compression-stroke damping force generating mechanism 433 is omitted. It should be noted that when one of the extension-stroke and compression-stroke damping force generating mechanisms 432 and 433 is set to hard damping, the other damping force generating mechanism is set to soft damping and vice versa. That is, damping force characteristics can be varied in opposite directions between an extension stroke and a compression stroke of the piston rod, which is suitable for effecting semi-active suspension control, based on a so-called skyhook theory.

Next, an operation of the damping force control type hydraulic shock absorber in the fifth embodiment will be described.

During the extension stroke of the piston rod 425, in accordance with movement of the piston 422, the hydraulic fluid in the upper cylinder chamber 419a is pressurized and flows through the extension-stroke fluid passage 430 to the lower cylinder chamber 419b, to thereby generate a damping force by virtue of the extension-stroke damping force generating mechanism 432. The hydraulic fluid in a volume corresponding to that of the portion of the piston rod 425 which has escaped from the cylinder 419 flows from the reservoir 421 through the check valve 436 in the fluid passage 434 of the base valve 429 to the lower cylinder chamber 419b.

In the extension-stroke damping force generating mechanism 432, before the main valve member 443 opens (in the low speed range of the piston speed), the hydraulic fluid flows from the extension-stroke fluid passage 430 to the lower cylinder chamber 419b through the fixed orifice 446 of the leaf spring 444, the back pressure chamber 445, the fluid passage 447, the extension-stroke pressure control valve 449, the fluid passage 448, the check valve 450 and the fluid passage 442a of the leaf spring 442. When the hydraulic pressure in the upper cylinder chamber 419a reaches the valve opening pressure for the main valve member 443 (the high speed range of the piston speed), the main valve member 443 opens and the hydraulic fluid flows through the sub valve member 441 into the lower cylinder chamber 419b. It should be noted that the check valve 450 prevents reverse flow of the hydraulic fluid in the extension-stroke fluid passage 430 during the compression stroke of the piston rod 425.

Therefore, before opening of the main valve member 443 (in the low speed range of the piston speed), a damping force is generated by virtue of the fixed orifice 446 and the extension-stroke pressure control valve 449. After opening of the main valve member 443, a damping force is generated by virtue of the main valve member 443 and the sub valve member 441 (the orifice passage 439a). By energizing the proportional solenoid 453 so as to adjust controlled pressure of the extension-stroke pressure control valve 449, a damping force before opening of the main valve member 443 can be directly controlled, regardless of the piston speed. In this instance, the pressure in th back pressure chamber 445 increases in accordance with an increase in the controlled pressure of the extension-stroke pressure control valve 449. Therefore, the valve opening pressure for the main valve member 443 can also be adjusted by adjusting the controlled pressure of the extension-stroke pressure control valve 449.

As mentioned above, the sub valve member 441 is disposed downstream of the main valve member 443. Therefore, as in the case of the fourth embodiment, when the damping force is set to soft damping (when the valve opening pressure for the main valve member 443 is low), the sub valve member 441 (the orifice passage 439a) makes up for a deficiency in the damping force generated by the main valve member 443, so that an appropriate damping force can be obtained. When the damping force is set to the type other than soft damping, although the differential pressure of the sub valve member 441 tends to increase the pressure on the upstream side of the main valve member 443, the pressure in the back pressure chamber 445 for the main valve member 443 is controlled, based on the pressure on the downstream side (that is, the pressure on a side of the lower cylinder chamber 419b) which is not affected by the sub valve member 441, so that the main valve member 443 opens to a degree such that it counteracts the effect of the damping force generated by the sub valve member 441. Thus, the damping force can be directly controlled by maintaining it at substantially the same level, according to the controlled pressure of the extension-stroke pressure control valve 449, without being affected by the sub valve member 441 and the piston speed. By this arrangement, optimum damping force characteristics can be obtained regardless of the piston speed over an entire range of from soft to hard damping force characteristics.

During the compression stroke of the piston rod 425, in accordance with movement of the piston 422, the check valve on the base valve 429 closes and the hydraulic fluid in the lower cylinder chamber 419b is pressurized and flows through the compression-stroke fluid passage 431 to the upper cylinder chamber 419a, to thereby generate a damping force by virtue of the compression-stroke damping force generating mechanism 433. The hydraulic fluid in a volume corresponding to that of the portion of the piston rod 425 which has entered the cylinder 419 flows from the lower cylinder chamber 419b through the disk valve 437 in the fluid passage 435 of the base 429 to the reservoir 421.

In the compression-stroke damping force generating mechanism 433, as in the case of the extension-stroke damping force generating mechanism 432, a damping force for the low speed range of the piston speed and a damping force for the high speed range of the piston speed can be controlled at the same time, regardless of the piston speed, in accordance with the current applied to the proportional solenoid 453. Further, optimum damping force characteristics can be obtained regardless of the piston speed over an entire range of from soft to hard damping force characteristics.

Hereinbelow, a modified example of the fifth embodiment will be described, with reference to FIGS. 17 and 18. The same portions as those stated in the fifth embodiment are designated by the same reference numerals and characters, and only the portions different from those stated In the fifth embodiment are described in detail.

Figure 17:
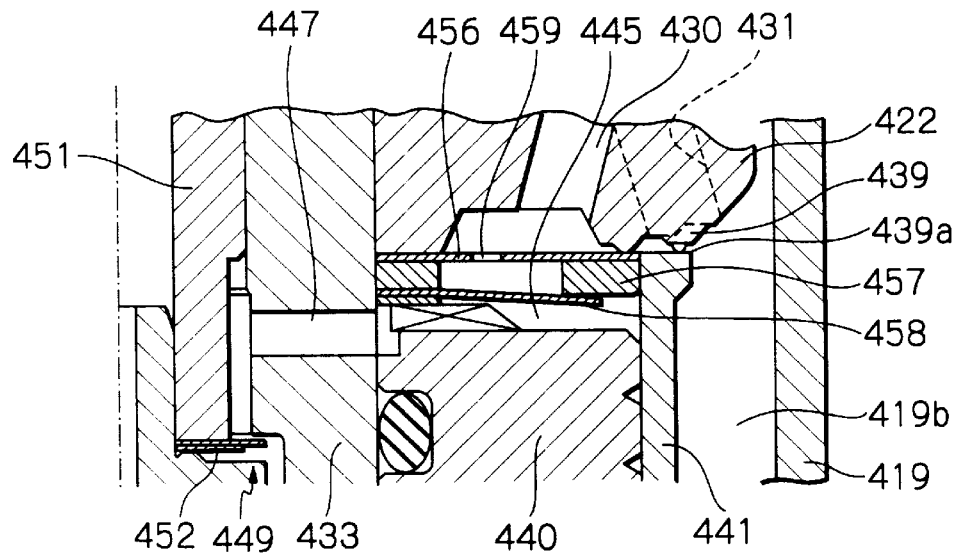
FIG. 17 is an enlarged view of an essential part of a modified example of the hydraulic shock absorber of FIG. 14.

In the modified example shown In FIG. 17, instead of the main valve member 443 in the fifth embodiment, a disk valve 456 having an inner peripheral portion clamped between the piston 422 and the fixing member 440 and an outer peripheral portion seated over the main valve seat 438 is provided. The outer peripheral portion of the disk valve 456 on a back side thereof abuts against an annular seal ring 457 made of, for example, PTFE. The seal ring 457 is slidably fitted into the sub valve member 441 so as to form the back pressure chamber 445. The seal ring 457 is biased under a force generated by a leaf spring 458 having an inner peripheral portion clamped, so as to press the disk valve 456 against the main valve seat 438. Further, a fixed orifice 459 communicating with the back pressure chamber 445 is formed in the disk valve 456. Thus, the same working effect as that of the fifth embodiment can be achieved.

Figure 18:
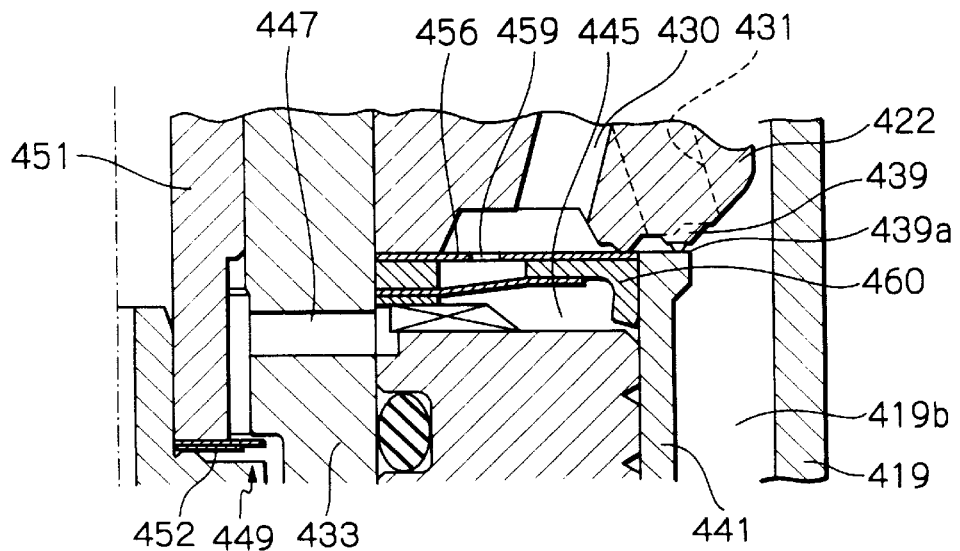
FIG. 18 is an enlarged view of an essential part of another modified example of the hydraulic shock absorber of FIG. 14.

FIG. 18 shows another modified example of the fifth embodiment. In FIG. 18, instead of the seal ring 457 in the modified example shown in FIG. 17, use is made of a seal ring 460 having a round, generally L-shaped cross section and made of, for example, PTFE graphite. By this arrangement, the same working effect as that of the fifth embodiment can be achieved.

Next, the sixth embodiment of the present invention will be described, with reference to FIG. 19. The sixth embodiment is substantially the same as the fifth embodiment, except that the structures of the pilot type damping valve and the sub damping valve are changed. Therefore, the same portions as those stated in the fifth embodiment are designated by the same reference numerals and characters, and only the portions different from those stated in the fifth embodiment are described in detail. Further, the extension-stroke damping force generating mechanism and the compression-stroke damping force generating mechanism are substantially the same in terms of a structure, so that only the extension-stroke damping force generating mechanism is described.

Figure 19:
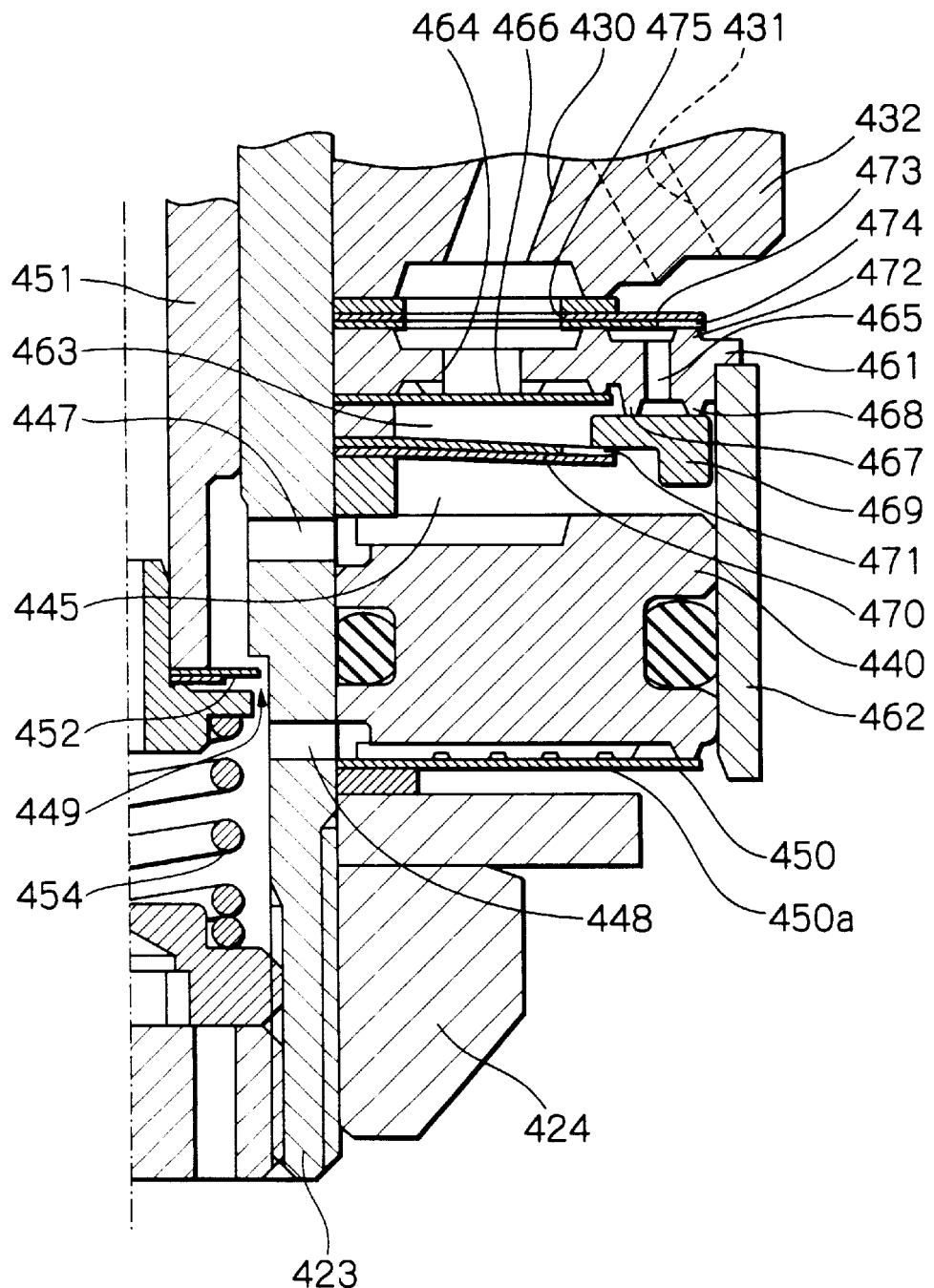
FIG. 19 is an enlarged vertical cross-sectional view showing an essential part of a damping force control type hydraulic shock absorber in a sixth embodiment of the present invention.

As shown in FIG. 19, in the sixth embodiment, a valve body 461 is provided between the piston 432 and the fixing member 440 and a cylindrical guide member 462 is liquid-tightly and fixedly fitted onto the fixing member 440 and the valve body 461. The valve body 461 includes a fluid passage 464 on a radially inner side thereof for enabling communication between a chamber 463, which is formed between the fixing member 440 and the valve body 461, and the extension-stroke fluid passage 430 of the piston 432 and also includes a fluid passage 465 on a radially outer side thereof for enabling communication between the chamber 463 and the lower cylinder chamber 419b.

A check valve 466 is provided on an end surface of the valve body 461 on a side of the fixing member 440, so as to permit a flow of the hydraulic fluid only from the fluid passage 464 to the chamber 463. At an outer periphery of the check valve 466, two annular valve seats (sealing valve seats) 467 and 468 are formed in the valve body 461. The valve seats 467 and 468 are, respectively, arranged on an inner side and an outer side of the fluid passage 465 and protrude beyond the check valve 466. An end portion of an annular main valve member (a pilot type damping valve) 469 is seated over the two valve seats 467 and 468. The main valve member 469 is slidably fitted into the guide member 462 while maintaining a clearance of about 0.02 mm between an outer circumferential surface of the main valve member 469 and an inner circumferential surface of the guide member 462. A disk-like leaf spring 470 clamped between the fixing member 440 and the valve body 461 abuts against an inner peripheral stepped portion at the other end portion of the main valve member 469, to thereby press the main valve member 469 against the valve seats 467 and 468. The back pressure chamber 445 is formed between the main valve member 469, the leaf spring 470, the guide member 462 and the fixing member 440. The internal pressure of the back pressure chamber 445 is applied in a direction for closing the main valve member 469. The leaf spring 470 includes a fixed orifice 471 which always permits communication between the chamber 463 and the back pressure chamber 445.

On an end surface of the valve body 461 on a side of the piston, a protruding annular valve seat 472 is formed on an outer side of the fluid passage 465. A sub disk valve (a sub damping valve) 473 clamped between the piston 432 and the valve body 461 is seated over the valve seat 472. The sub disk valve 473 includes an orifice 474 which always permits communication between the fluid passage 465 and the lower cylinder chamber 419b and an opening 475 for permitting communication between the extension-stroke fluid passage 430 of the piston 432 and the fluid passage 464 of the valve body 461.

By this arrangement, during the extension stroke of the piston rod 425, the hydraulic fluid in the upper cylinder chamber 419a flows from the extension-stroke fluid passage 430 through the fluid passage 464 of the valve body 461 and the check valve 466 into the chamber 463. Before opening of the main valve member 469, the hydraulic fluid flows into the lower cylinder chamber 419b through the fixed orifice 471, the back pressure chamber 445, the fluid passage 447, the extension-stroke pressure control valve 449, the fluid passage 448 and the check valve 450. When the hydraulic pressure in the upper cylinder chamber 419a reaches the valve opening pressure for the main valve member 469, the main valve member 469 is separated from the two valve seats 467 and 468, so that the hydraulic fluid flows from the chamber 463 into the lower cylinder chamber 419b through the fluid passage 465, the orifice 474 and the sub disk valve 473. The check valve 466 prevents reverse flow of the hydraulic fluid in the extension-stroke fluid passage 430 during the compression stroke of the piston rod 425.

As in the case of the fifth embodiment, by adjusting the controlled pressure of the extension-stroke pressure control valve 449, a damping force before opening of the main valve member 469 (in the low speed range of the piston speed) can be directly controlled. At the same time, the valve opening pressure for the main valve member 469 is adjusted according to the pressure in the back pressure chamber 445, so that a damping force after opening of the main valve member 469 (in the high speed range of the piston speed) can also be controlled.

Due to the effect of the sub disk valve 473 and the orifice 474 disposed downstream of the main valve member 469, a damping force for soft damping can be appropriately increased, without affecting damping force characteristics for hard damping. Thus, optimum damping force characteristics can be obtained regardless of the piston speed over an entire range of from soft to hard damping force characteristics. During the compression stroke, optimum damping force characteristics can be obtained in substantially the same manner as mentioned above.

When the main valve member 469 is closed, it is seated over the two valve seats 467 and 468, so that not only can the chamber 463 and the fluid passage 465 be sealed off from each other, but the chamber 463 and the back pressure chamber 445 can also be securely sealed off from each other. Therefore, the chamber 463 and the back pressure chamber 445 can be securely sealed off from each other, regardless of the clearance in a slide portion between the main valve member 469 and the guide member 462. Therefore, a large clearance can be set for the slide portion between the main valve member 469 and the guide member 462. Therefore, high precision is not required for the dimensions of the slide portion, so that finishing processes such as polishing and honing can be omitted, thereby reducing production cost. By increasing the clearance in the slide portion, a stable operation can be maintained even when foreign matter such as powder produced due to wear contaminate the hydraulic fluid. Further, the axial length of the slide portion can be reduced, leading to a reduction in size and weight and a high degree of responsiveness of the hydraulic shock absorber.

A leakage between the main valve member 469 and the guide member 462 is of concern mainly in a range of an extremely low flow rate for hard damping. When the main valve member 469 is open for soft to medium damping or for hard damping, the amount of leakage relative to the area of an opening of the valve is sufficiently small, so that the leakage due to the clearance between the main valve member 469 and the guide member 462 can be negligible.

As has been described above in detail, in the damping force control type hydraulic shock absorber in the fifth and sixth embodiments, a damping force before opening of the pilot type damping valve can be directly controlled by virtue of a variable damping valve, and the valve opening pressure for the pilot type damping valve can also be controlled by varying the pilot pressure, by virtue of the variable damping valve. When the pilot type damping valve is open, a damping force can be generated by virtue of the pilot type damping valve and a sub damping valve. The sub damping valve is disposed downstream of the pilot type damping valve in the main passage, so that the pilot pressure in the sub passage is not affected by the sub damping valve. Consequently, optimum damping force characteristics can be obtained regardless of the piston speed over an entire range of from soft to hard damping force characteristics.

In the sixth embodiment, when the pilot type damping valve is closed, the valve body is seated over the sealing valve seats, to thereby seal off the slide portion between the valve body and the guide member. Therefore, the back pressure chamber can be securely sealed off, regardless of sealability of the slide portion. Therefore, high dimensional precision is not required with respect to the slide portion, so that finishing processes such as polishing and honing can be omitted, thereby reducing production cost. By increasing the clearance in the slide portion, a stable operation can be maintained even when foreign matter such as powder due to wear contaminate the hydraulic fluid. Further, the axial length of the slide portion can be reduced, to thereby achieve a reduction in size and weight of the hydraulic shock absorber and hence a high degree of responsiveness.

What is claimed is:

1. A damping force control type hydraulic shock absorber comprising:

a cylinder in which a hydraulic fluid is to be sealably contained;

a piston slidably received within said cylinder;

a piston rod having one end connected to said piston and an opposite end extending outwardly from said cylinder;

a main fluid passage and a sub fluid passage in fluid communication with said cylinder, such that upon a sliding movement of said piston within said cylinder the hydraulic fluid is allowed to flow through said main fluid passage and sub fluid passage;

a pilot type damping valve in said main fluid passage; and a fixed orifice and a pressure control valve within said sub fluid passage, such that a pressure of the hydraulic fluid in said sub fluid passage between said fixed orifice and said pressure control valve can be applied to said pilot type damping valve as a pilot pressure, wherein said pressure control valve includes a valve chamber between a cylindrical sleeve and a slider that is slidably received within said cylindrical sleeve, whereby a thrust of said slider is to be generated due to a difference between pressure-receiving areas of said slider within said valve chamber, which pressure-receiving areas are to receive a pressure that is to act in an axial direction of said slider, and wherein a valve opening pressure is to be controlled in accordance with a balance between the thrust of said slider and a thrust of a solenoid.

2. The damping force control type hydraulic shock absorber according to claim 1, further comprising a disk valve connected to said slider, wherein one of the pressure-receiving areas corresponds to a surface of said disk valve.

3. The damping force control type hydraulic shock absorber according to claim 2, further comprising an extension-stroke valve chamber and a compression-stroke valve chamber at respective opposite end portions of said slider, whereby damping force characteristics are to be varied in opposite directions between an extension stroke and a compression stroke of said piston rod.

4. The damping force control type hydraulic shock absorber according to claim 2, further comprising an extension-stroke valve chamber and a compression-stroke valve chamber at respective opposite end portions of said slider, whereby damping force characteristics are to be varied in the same direction between an extension stroke and a compression stroke of said piston rod.

5. The damping force control type hydraulic shock absorber according to claim 1, further comprising an extension-stroke valve chamber and a compression-stroke valve chamber at respective opposite end portions of said slider, whereby damping force characteristics are to be varied in opposite directions between an extension stroke and a compression stroke of said piston rod.

6. The damping force control type hydraulic shock absorber according to claim 1, further comprising an extension-stroke valve chamber and a compression-stroke valve chamber at respective opposite end portions of said slider, whereby damping force characteristics are to be varied in the same direction between an extension stroke and a compression stroke of said piston rod.

7. The damping force control type hydraulic shock absorber according to claim 1, wherein said pilot type damping valve comprises:

a main valve separably seated on a seat portion having a diameter;

a valve member on a back side of said main valve so as to form a pilot chamber therebetween, with said valve member having an outer diameter that is greater than the diameter of said seat portion;

a cylindrical slide member slidably received on said valve member, with said cylindrical slide member to abut against said main valve; and a disk member to bias said main valve, through said cylindrical slide member, in a valve closing direction, with said disk member including an opening therein; and a circular plate on a back side of said disk member, with said circular plate for opening and closing said opening in said disk member and for applying a pressure to bias said main valve, through said disk member and said cylindrical slide member, in the valve closing direction, wherein said sub fluid passage extends from said pilot chamber and through said pressure control valve so as to bypass a part of said main fluid passage and communicate with a back side of said valve member.

8. The damping force control type hydraulic shock absorber according to claim 7, wherein said cylindrical slide member is to abut against said main valve at a portion thereof that has an inner diameter which is greater than an inner diameter of said seat portion.

9. The damping force control type hydraulic shock absorber according to claim 1, wherein said pressure control valve comprises a variable damping valve.

10. The damping force control type hydraulic shock absorber according to claim 9, further comprising in said main fluid passage a sub damping valve downstream of said pilot type damping valve.

11. The damping force control type hydraulic shock absorber according to claim 10, wherein said pilot type damping valve comprises:

a pilot chamber to have an internal pressure that is to be applied as a pilot pressure to a main valve in a valve closing direction, with the main valve to open and close said main fluid passage and to be slidably guided by a guide member, and also defining part of said pilot chamber; and a sealing valve seat on which the main valve is to be seated when the main valve closes said main fluid passage to seal off a slide portion defined between the main valve and the guide member.

12. The damping force control type hydraulic shock absorber according to claim 11, wherein said sub damping valve includes the guide member, and the guide member is movable.

13. The damping force control type hydraulic shock absorber according to claim 1, further comprising in said main fluid passage a sub damping valve downstream of said pilot type damping valve.

14. The damping force control type hydraulic shock absorber according to claim 13, wherein said pilot type damping valve comprises:

a pilot chamber to have an internal pressure that is to be applied as a pilot pressure to a main valve in a valve closing direction, with the main valve to open and close said main fluid passage and to be slidably guided by a guide member, and also defining part of said pilot chamber; and a sealing valve seat on which the main valve is to be seated when the main valve closes said main fluid passage to seal off a slide portion defined between the main valve and the guide member.

15. The damping force control type hydraulic shock absorber according to claim 14, wherein said sub damping valve includes the guide member, and the guide member is movable.

16. The damping force control type hydraulic shock absorber according to claim 1, further comprising a disk valve connected to said slider, wherein one of the pressure-receiving areas corresponds to a surface said disk valve and another of said pressure-receiving areas corresponds to a stepped surface of said slider.

17. The damping force control type hydraulic shock absorber according to claim 16, further comprising an extension-stroke valve chamber and a compression-stroke valve chamber at respective opposite end portions of said slider, whereby damping force characteristics are to be varied in opposite directions between an extension stroke and a compression stroke of said piston rod.

18. The damping force control type hydraulic shock absorber according to claim 16, further comprising an extension-stroke valve chamber and a compression-stroke valve chamber at respective opposite end portions of said slider, whereby damping force characteristics are to be varied in the same direction between an extension stroke and a compression stroke of said piston rod.

* * * * *